Nov. 15, 1927.

W. W. LANDSIEDEL 1,649,478

CALCULATING MACHINE

Filed Jan.14, 1924     14 Sheets-Sheet 1

Fig-1-

INVENTOR.
Walter W. Landsiedel,
BY Rippey Kingsland,
HIS ATTORNEYS.

Nov. 15, 1927.

W. W. LANDSIEDEL 1,649,478

CALCULATING MACHINE

Filed Jan. 14, 1924     14 Sheets-Sheet 2

INVENTOR.
Walter W. Landsiedel,
BY Rippey & Kingsland
HIS ATTORNEYS.

Nov. 15, 1927. 1,649,478
W. W. LANDSIEDEL
CALCULATING MACHINE
Filed Jan. 14, 1924 14 Sheets-Sheet 3

INVENTOR.
Walter W. Landsiedel,
BY Rippey Kingsland,
HIS ATTORNEYS.

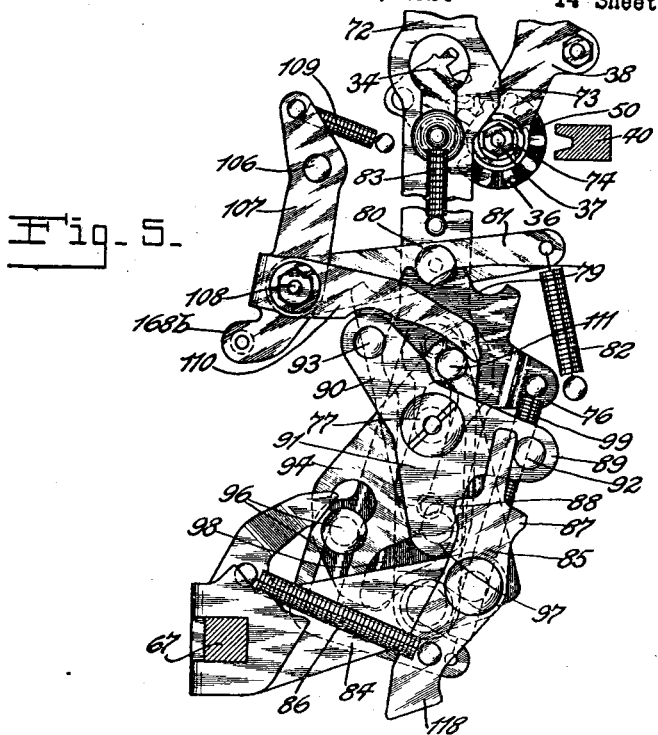

Nov. 15, 1927.
W. W. LANDSIEDEL
CALCULATING MACHINE
Filed Jan. 14, 1924
1,649,478
14 Sheets-Sheet 5
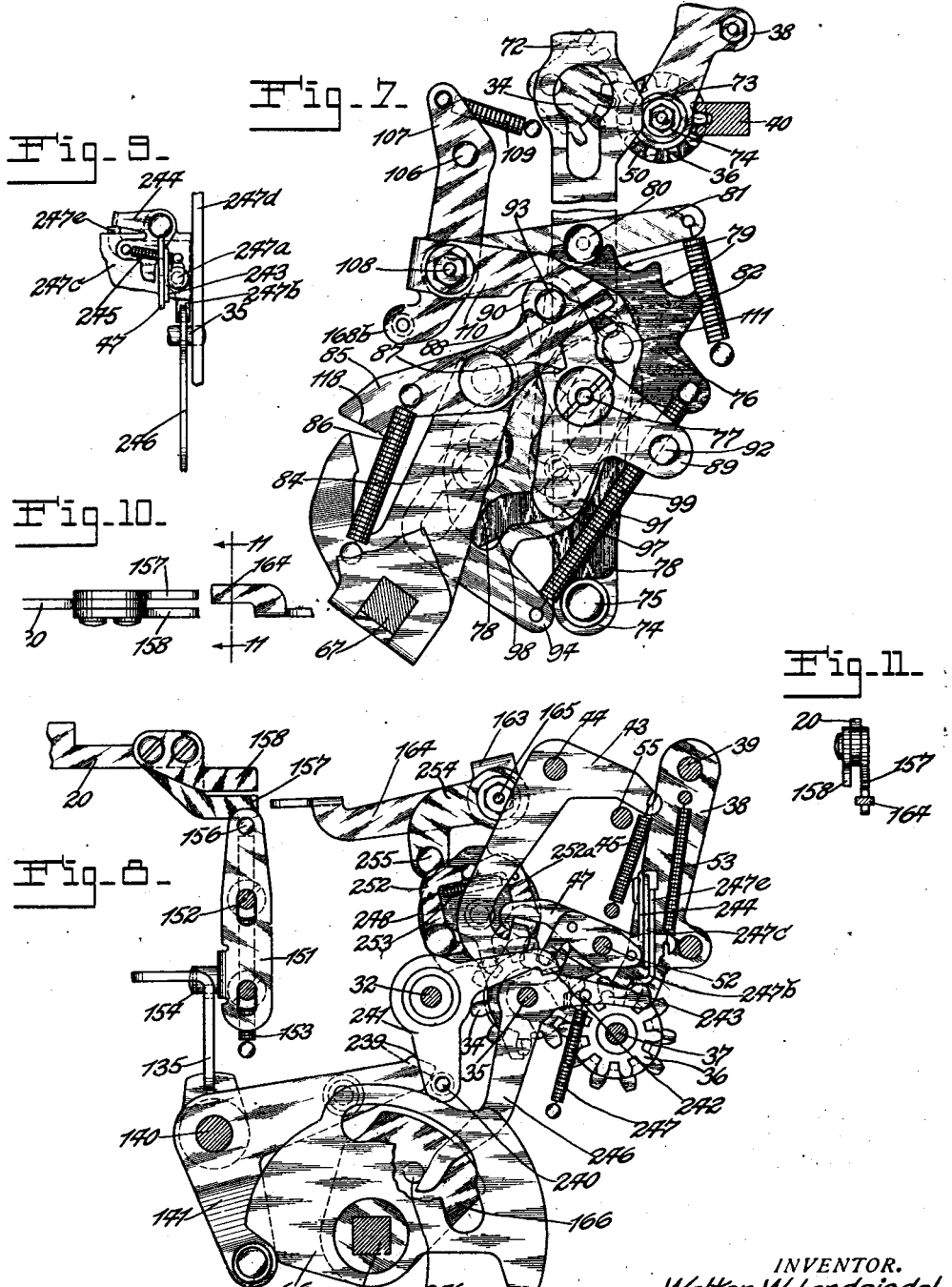
INVENTOR.
Walter W. Landsiedel,
BY
HIS ATTORNEYS.

Nov. 15, 1927.

W. W. LANDSIEDEL 1,649,478

CALCULATING MACHINE

Filed Jan. 14, 1924   14 Sheets-Sheet 6

INVENTOR.
Walter W. Landsiedel,
BY Rippey & Kingsland,
HIS ATTORNEYS.

Nov. 15, 1927.  1,649,478
W. W. LANDSIEDEL
CALCULATING MACHINE
Filed Jan. 14, 1924  14 Sheets-Sheet 7
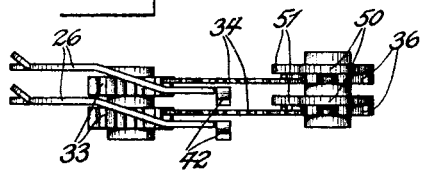
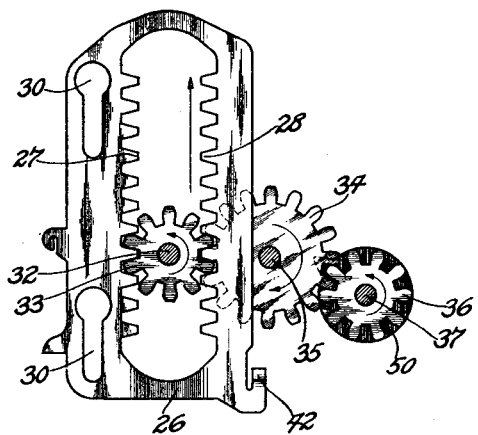
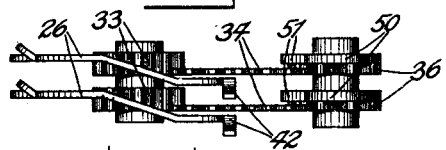
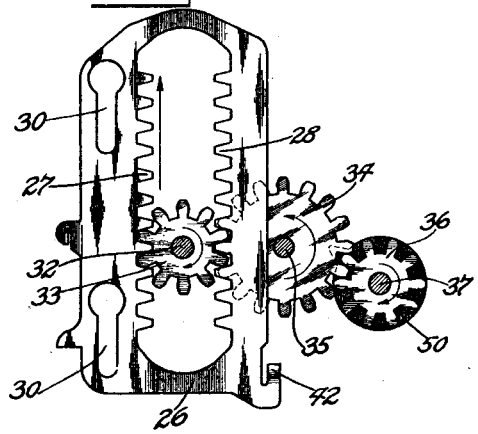
INVENTOR.
Walter W. Landsiedel,
BY
HIS ATTORNEYS.

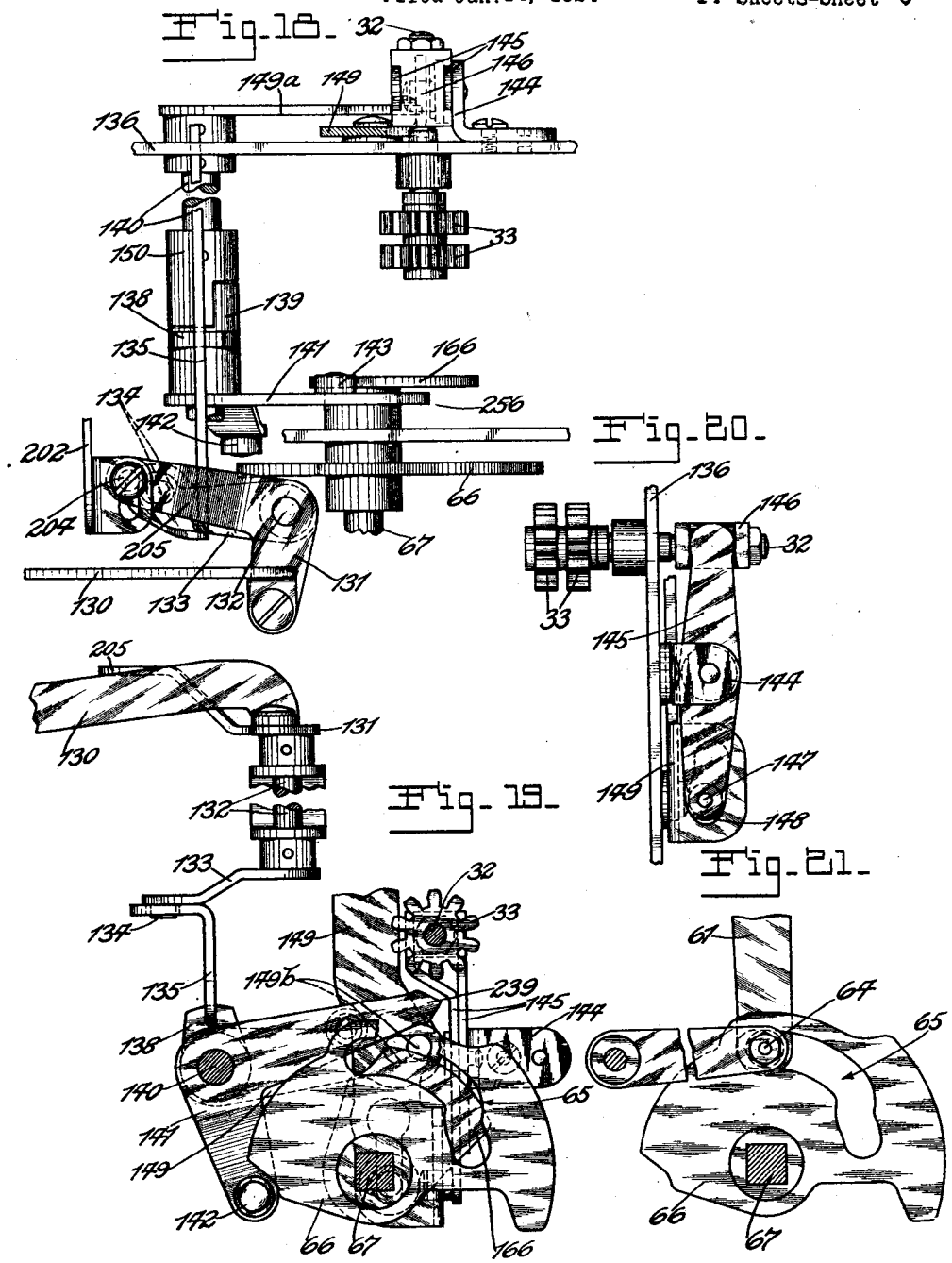

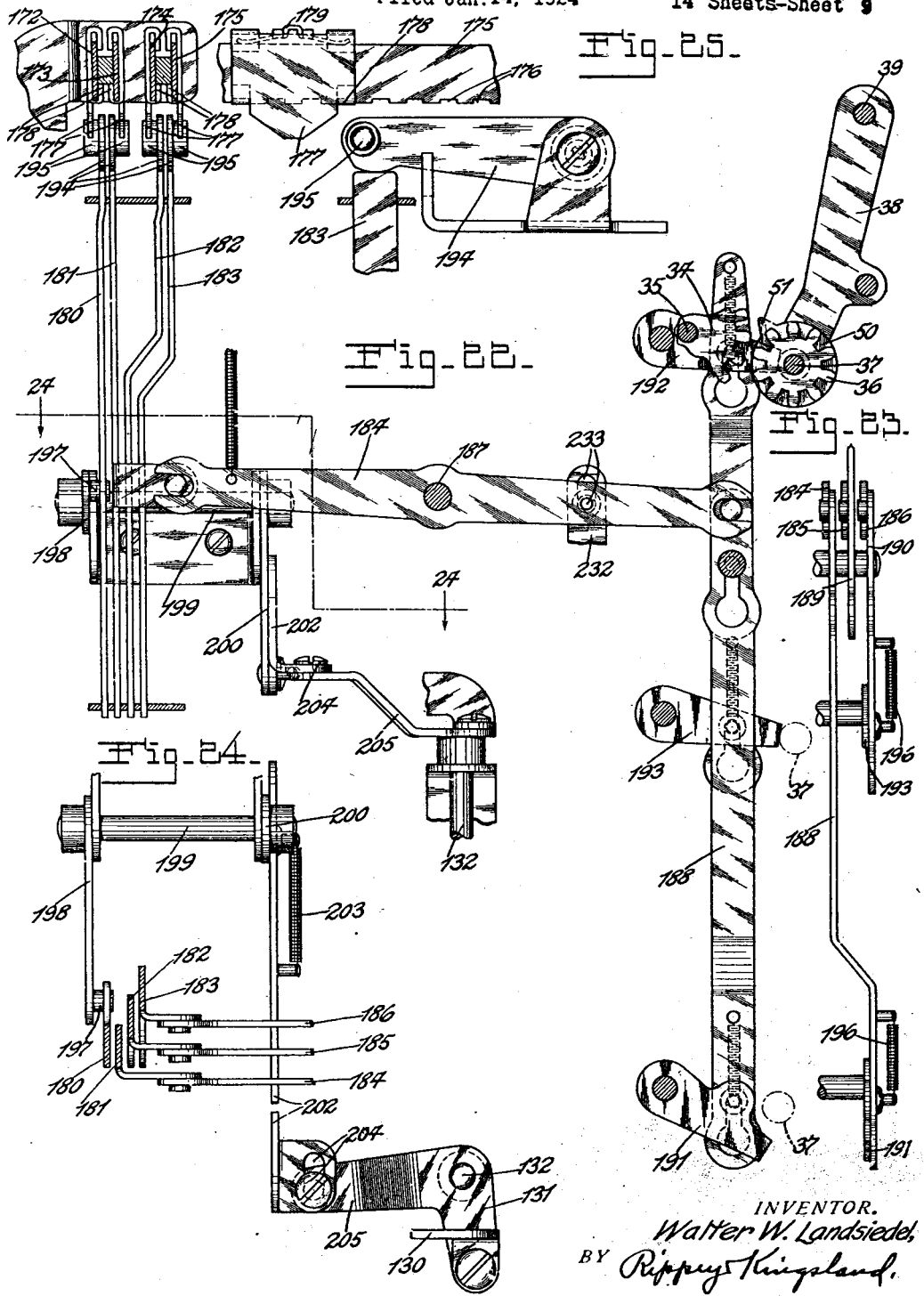

Nov. 15, 1927. 1,649,478
W. W. LANDSIEDEL
CALCULATING MACHINE
Filed Jan. 14, 1924  14 Sheets-Sheet 10
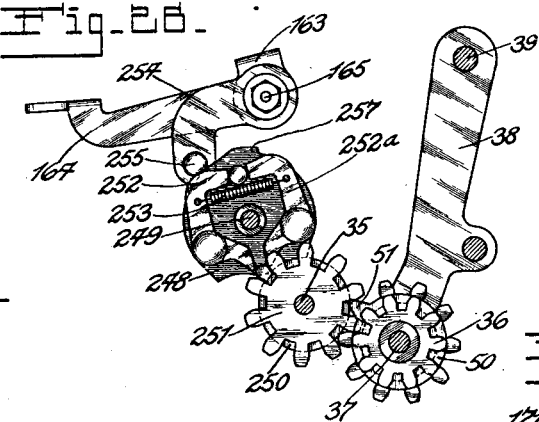
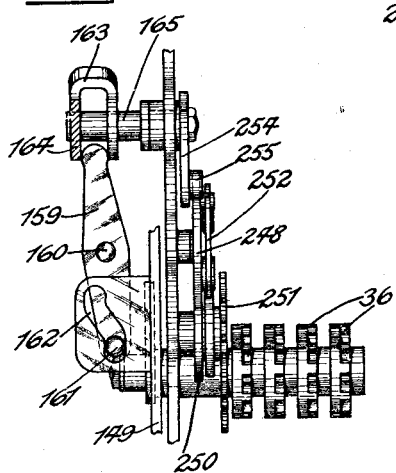
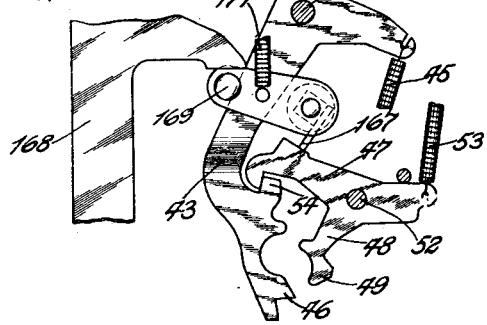
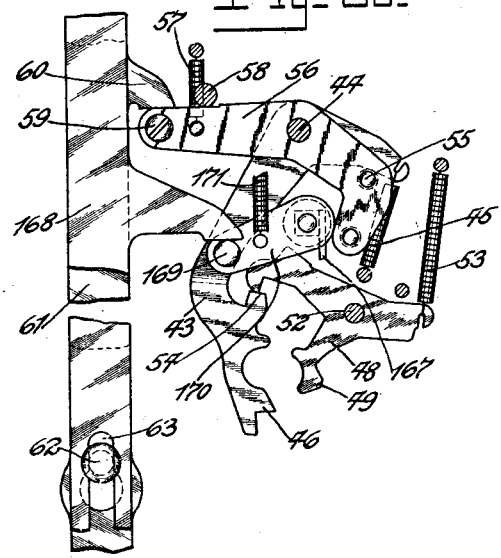
INVENTOR.
Walter W. Landsiedel,
BY
HIS ATTORNEYS.

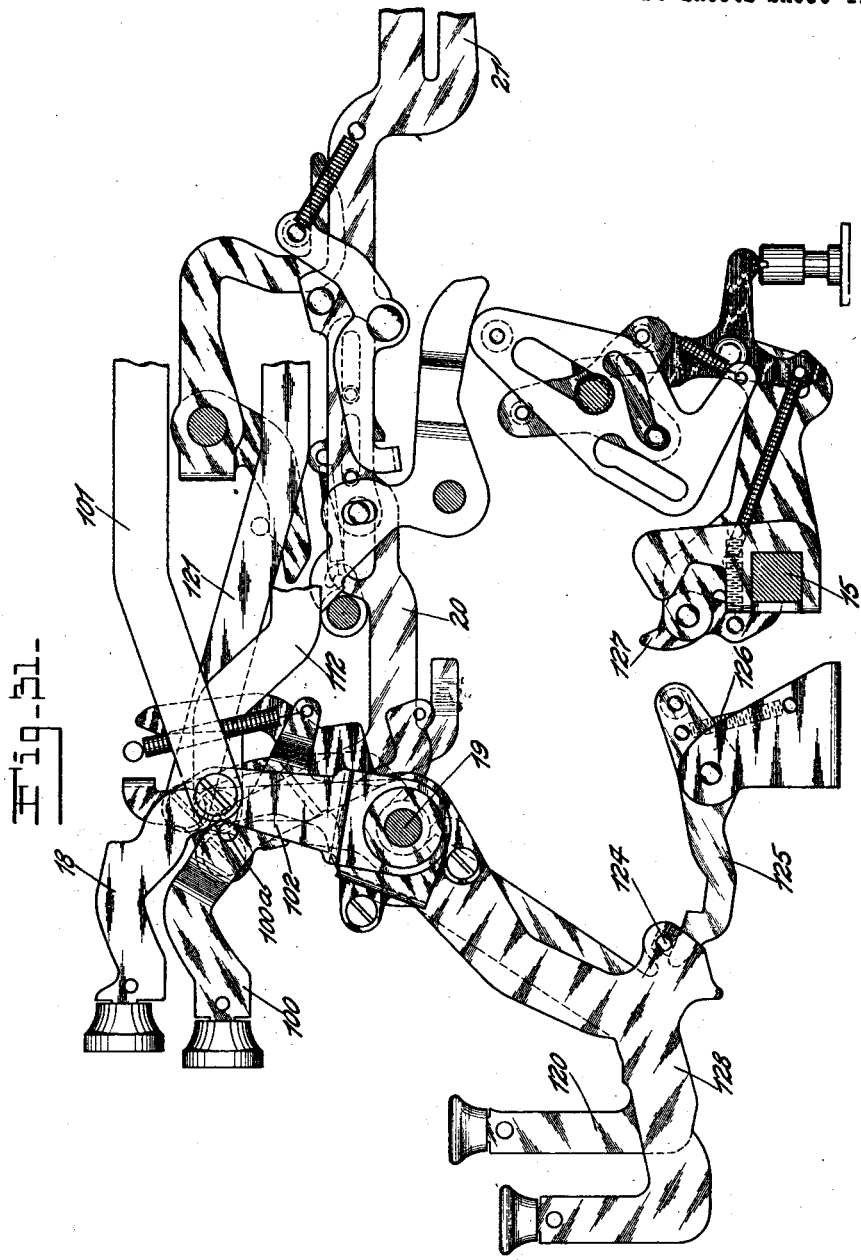

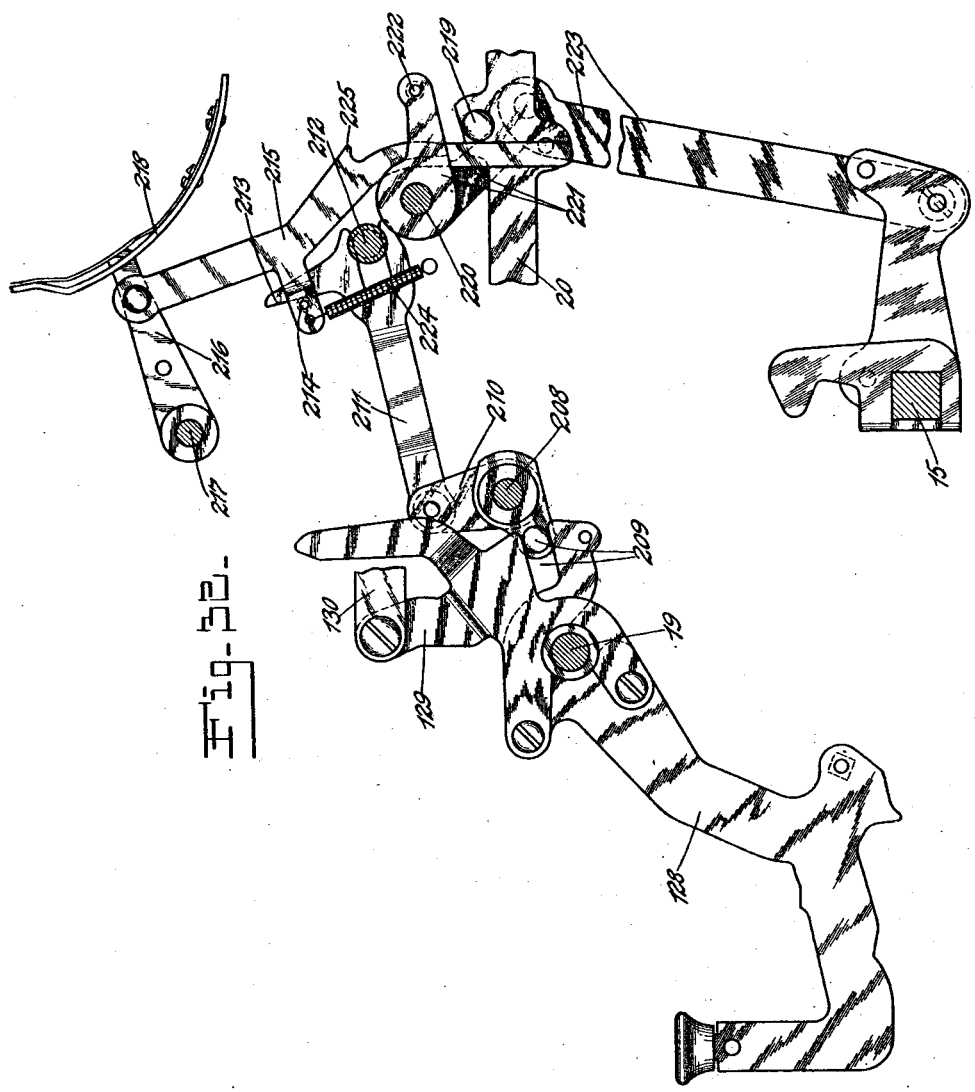

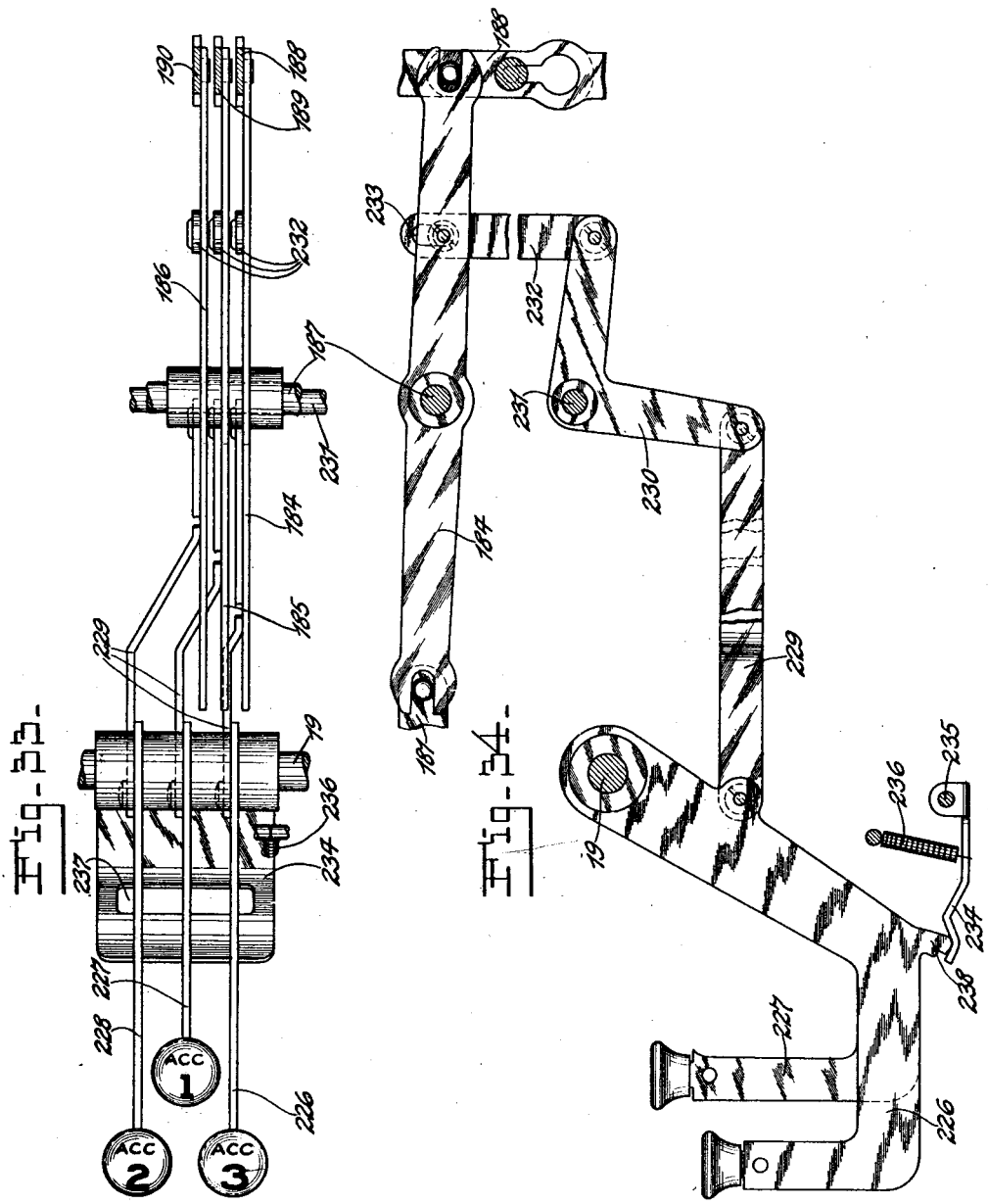

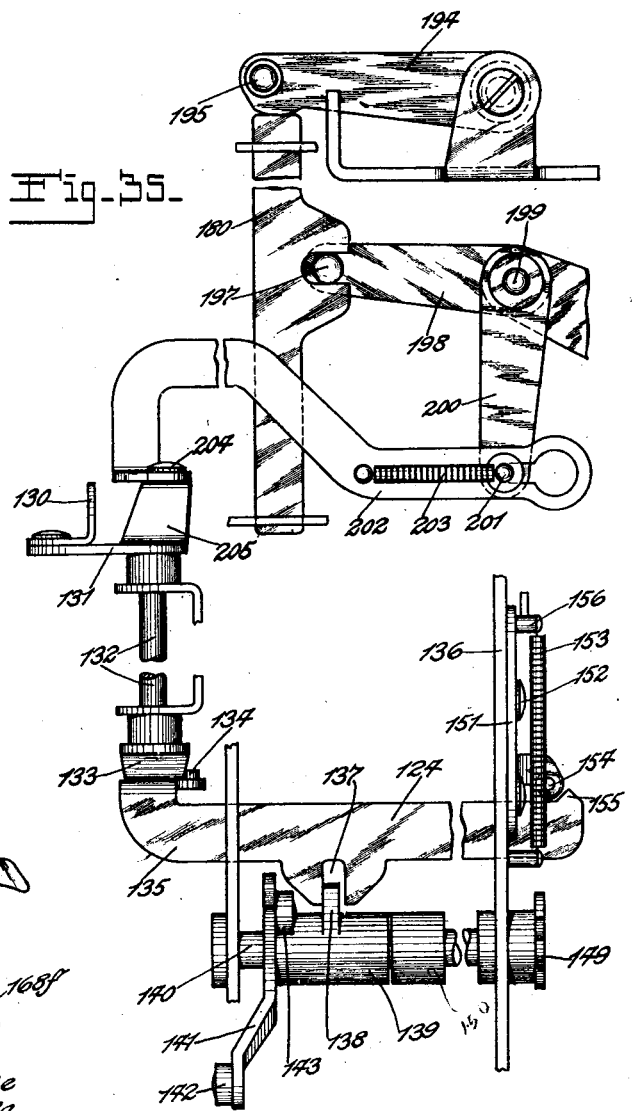

Patented Nov. 15, 1927.

1,649,478

UNITED STATES PATENT OFFICE.

WALTER WILLIAM LANDSIEDEL, OF NORWOOD, OHIO, ASSIGNOR, BY MESNE ASSIGNMENTS, TO REMINGTON RAND INC., OF TONAWANDA, NEW YORK, A CORPORATION OF DELAWARE.

CALCULATING MACHINE.

Application filed January 14, 1924. Serial No. 686,023.

This invention relates to calculating machines.

An object of the invention is to provide a calculating machine with mechanism for controlling a set of counters to perform the operation of subtraction by the direct process, as distinguished from the method of using complementary numbers by utilizing a set of actuators to actuate said counters in subtracting operations or in adding operations, as desired.

Another object of the invention is to provide a calculating machine with a number of sets of counters and mechanism for controlling at least one set of counters to perform adding operations and at least another set of counters to perform subtracting operations by the direct process, both sets of counters being operated at the same time.

Another object of the invention is to provide a calculating machine equipped with the mechanisms last above mentioned and also equipped with a laterally adjustable paper carriage and mechanism for controlling the sets of counters to perform adding and subtracting operations, such operations being determined by the adjustment of the paper carriage.

Another object of the invention is to provide the machine with means for preventing effective operation of the counters by means of the control of the paper carriage.

Another object of the invention is to provide the machine with mechanism for printing and automatically designating a correct negative total obtained by operating the machine to perform subtracting operations by the direct method.

Another object of the invention is to provide the machine with one or more sets of counters in addition to the usual set of adding pinions, and means for controlling the additional set or sets of counters to perform various calculations as desired such, for instance, as subtracting operations by the direct method.

Various other objects will appear from the following description, reference being made to the drawings in which Fig. 1 is a side elevation of the operating mechanism of the machine with certain shafts in section and other parts broken away.

Fig. 3 is a side elevation of the mechanism for controlling the counters that are utilized in addition to the usual adding pinions, in order to place the counters in or out of mesh with their actuators, the counters being shown in mesh with the actuators.

Fig. 4 is a similar view showing the counters out of mesh with their actuators and the controlling shaft turned to its forward position.

Fig. 5 is a view corresponding to Fig. 3, except that the parts are in position for operation to take or print a total or other number represented in the counters.

Fig. 6 is a view corresponding to Fig. 4, showing the mechanism operated in a non-adding operation with connections for controlling such operation.

Fig. 7 is a view showing the countercontrol mechanism in a position during the return movement of the parts in order to leave the counters in a clear condition.

Fig. 8 is a view showing the mechanism for controlling the counters to obtain a correct negative total by subtraction.

Fig. 9 is a view showing a latching device controlling the transfer of an additional unit into the counter in units denominational order in subtracting operations to obtain a correct negative total.

Fig. 10 is a plan view of the parts shown in the upper left hand portion of Fig. 8 which function in the operation of the machine to obtain a negative total.

Fig. 11 is a sectional view on the line 11—11 of Fig. 10.

Fig. 14 is a plan view of the actuating devices in position for actuating the counters in adding operations.

Fig. 15 is a side elevation thereof, the direction of movement of the parts being indicated by arrows.

Fig. 16 is a plan view of the actuating devices in position for actuating the counters in a subtracting operation to obtain a negative total.

Fig. 17 is a side elevation of the parts in position for operating the counters to position in subtracting operations to obtain a correct negative total, the direction of movement of the parts being indicated by arrows.

Fig. 18 is a plan view of the mechanism for shifting the actuator pinions laterally to positions for operation in addition or in the performance of subtracting operations.

Fig. 19 is a side elevation of the same mechanism.

Fig. 20 is a rear elevation of the connections for shifting the pinions.

Fig. 21 is a view showing part of the connections for connecting and disconnecting the counter pinions from their actuators.

Fig. 22 is a side elevation of the counter control mechanism operated by the paper carriage.

Fig. 23 is a rear elevation of the lower portion of the same device.

Fig. 24 is a sectional view on the line 24—24 of Fig. 22.

Fig. 25 is a rear elevation of the carriage control devices by which the paper carriage controls the operation of the counters.

Fig. 26 is a side elevation of a portion of the mechanism for controlling the counters in subtracting operations.

Fig. 27 is a front elevation thereof.

Fig. 28 is a side elevation of the transfer pawl locking device in locking position.

Fig. 29 is a view of the same mechanism showing the transfer pawl locking device in unlocking position.

Fig. 30 is a view showing a portion of the transfer devices and means for restoring them to effective positions.

Fig. 31 is a side elevation of the keys for controlling the operation of the machine in taking a total in performing subtracting operations and in controlling the machine to prevent adding or subtracting operations thereof with a part of the key connections.

Fig. 32 is a side elevation of the subtracting key and its connections to the ribbon mechanism so that negative totals may be printed in a distinctive color from the color in which the items are printed.

Fig. 33 is a plan view of the keys for selectively controlling the operation of the various calculating devices.

Fig. 34 is a side elevation thereof.

Fig. 35 is a rear elevation of the mechanism for shifting the rack operated pinions laterally to positions for performing adding or subtracting operations, as desired.

Fig. 36 is a view showing the means for release of the latches of the transfer mechanism when taking a total or subtotal.

Figure 1:
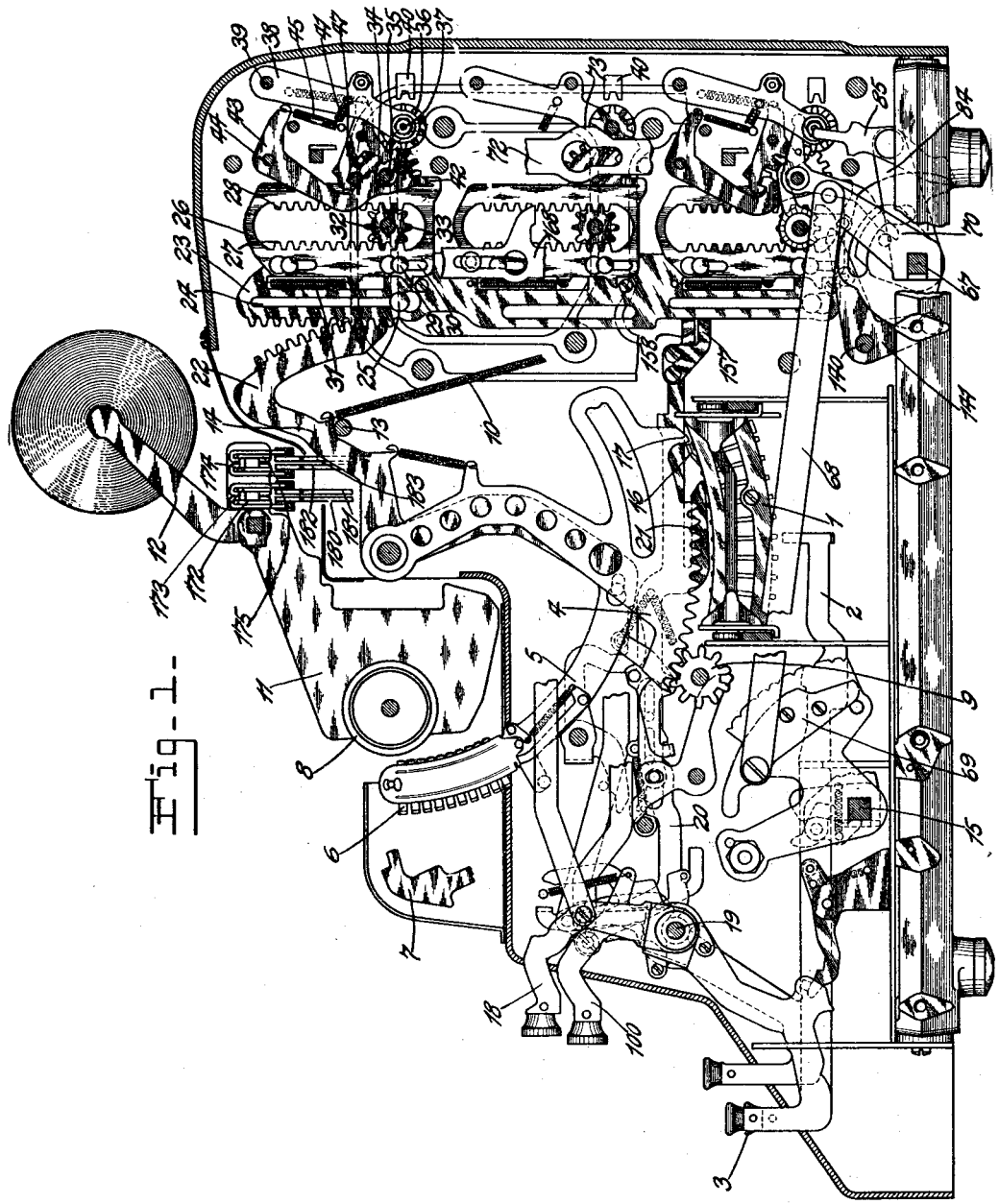

For convenience the invention is shown embodied in a machine of the Dalton type in which the items involved in the calculations are set up in a differential mechanism 1 by means of levers 2 terminating in a keyboard and being provided with key buttons 3. By cooperation of racks 4, the differential movements of which are limited by the differential mechanism 1, type carriers 5 carrying type 6, type driving hammers 7 for driving the type to print upon paper fed thereto by a platen 8, and adding pinions 9, the items may be recorded and added. The type carriers are actuated to recording position by springs 10 and are returned to their initial starting points by the usual mechanism. The platen 8 is mounted in a laterally shiftable paper carriage 11 which, as shown, carries a support 12 for the paper roll so that the paper may be fed to different columnar positions. The rod 13 is swung forwardly when the machine is operated and on its return movement engages extended arms 14 of the type carriers and thereby restores the type carriers to their initial positions; each operation of the machine also involving forward and backward rocking movement of a shaft 15, all substantially as disclosed in Hubert Hopkins' Patent No. 1,039,130, dated September 24, 1912.

In printing a total in the differential mechanism it is necessary to move the detent plate 16 out of the way of the shoulders 17 on the racks 4 to leave the racks and their associated type carriers free to move forwardly, while the racks are in engagement with the adding pinions 9. This is accomplished by pushing inwardly a total key 18 attached to a rock shaft 19 and which moves the detent 16 out of the way of the shoulders 17, leaving the racks and type carriers free to move.

My invention is shown embodied in a machine containing the above described familiar devices. In order to provide a cooperative relationship between the present invention and the devices described above the rear ends of the type carrier arms 14 are provided with arcuate racks 22 which mesh with racks formed on the upper ends of sliding supports 23 having longitudinal slots 24 through which retaining guide rods 25 extend, said rods holding the sliding supports 23 in proper operative relationship with the racks 22. When the machine is at rest the type carriers 5 are in their retracted positions, thereby holding the sliding supports 23 in their raised positions; but when the type carriers move forwardly the sliding supports 23 are moved downwardly corresponding distances.

In the embodiment of the invention shown there are three sets of calculating mechanisms in addition to the usual adding pinions 9. The additional calculating mechanisms may be operated selectively or simultaneously, the invention embodying means under control of the paper carriage for determining which calculating mechanism will operate, and also embodying manual means for the same purpose.

Figure 12:
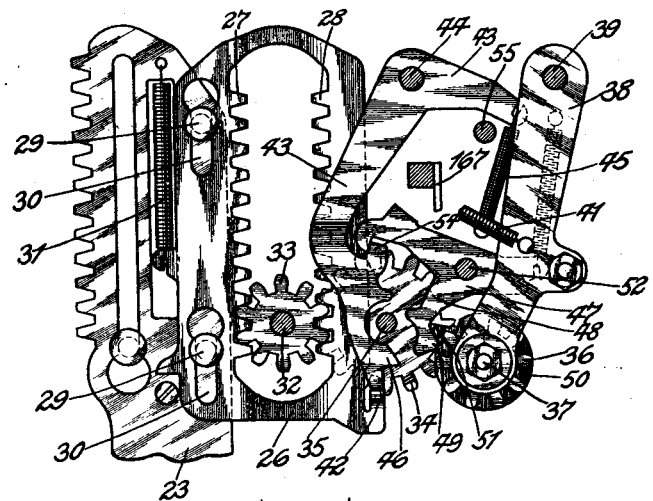
Fig. 12 is a view showing the counters and their actuators including the transfer control devices in their normal positions.
Figure 13:
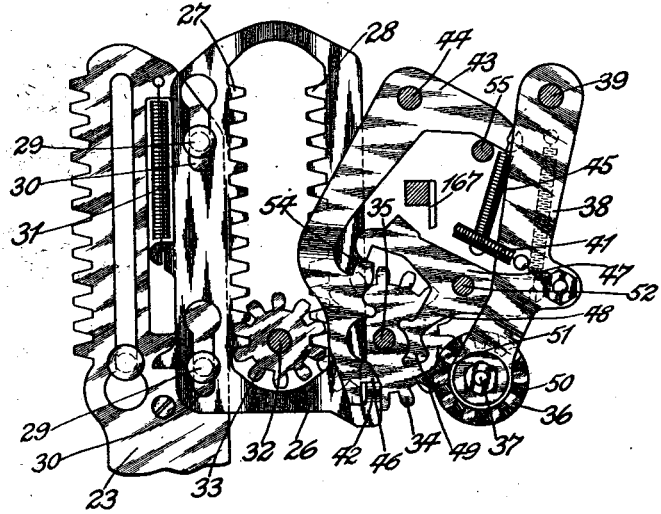
Fig. 13 is a similar view showing the parts in the position they occupy in a transfer operation.

Each of the sliding supports 23 supports for relative sliding movements thereon a rack plate 26 for each special calculating mechanism. In each rack plate 26 a pair of racks are formed. The racks 27 on each pair of racks are offset laterally (Figs. 14 and 16) from the corresponding rack 28 of each pair of racks. The rack plates 26 are retained in connection with the sliding supports 23 by headed pins or rivets 29 passing through slots 30 in the rack plates and secured to the sliding support, thereby permitting the rack plates 26 to move independently of the supports 23 in transferring operations. The rack plates 26 are actuated upwardly relative to the sliding supports 23 by springs 31 (Figs. 1, 12 and 13). As shown the racks 27 and 28 form the inner edges of vertical slots in the rack plates 26, an axially shiftable shaft 32 extending laterally through each series of slots so that there is one such shaft 32 for each special calculating mechanism. A series of pinions 33 are rotative upon each shaft 32, said pinions being shiftable with the shafts on which they are mounted to mesh with the racks 27 or 28 as desired, depending upon whether subtracting or straight adding operations are being performed. In case the machine is being operated for straight addition, the pinions 33 are meshed with the racks 28 (Figs. 14 and 15); and when the machine is being operated for the performance of subtraction the pinions 33 are in mesh with the racks 27 (Figs. 16 and 17). Irrespective of the lateral position of the pinions 33, each of said pinions is in permanent mesh with a corresponding intermediate pinion 34 of the calculating mechanism, but the pinions 33 never mesh with the racks 27 and 28 at the same time. The means for shifting the pinions 33 from engagement with the racks 27 to engagement with the racks 28, and vice versa, is hereinafter described. The intermediate pinions 34 of each special calculating device are mounted on a shaft 35 parallel with the corresponding shaft 32.

The calculating pinions 36 of each calculating device are supported for independent rotation upon a shaft 37 in a frame 38 swinging from a supporting rod 39 (Figs. 1, 12 and 13). By swinging the frames 38 the pinions 36 are movable into and out of engagement with the intermediate pinions 34. When performing an adding or subtracting operation the pinions 36 are in mesh with the pinions 34 only during upward movement of the sliding rack plates 26. The direction of movement of the swinging parts when performing an adding operation, that is when the pinions 32 are in mesh with the racks 28, is indicated by the arrows in Fig. 15; and the direction of movement of the parts when performing a subtracting operation, that is when the pinions 32 are in mesh with the racks 27, is indicated by the arrows in Fig. 17. When the pinions 36 are out of engagement with the intermediate pinions 34, they are engaged by locking bars 40 one of which is provided for each set of pinions 36 (Figs. 1 and 4). Springs 41 (Figs. 1, 12 and 13) actuate the frames 38 to engage the pinions 36 with the pinions 34, and to retain them in such engagement during operation thereof.

When it is necessary to transfer from a lower to a higher denominational order, the pinion 36 in the order from which transfer is made releases the rack plate 26 in the next higher denominational order and the released rack plate is moved upwardly by its spring 31 a distance sufficient to make the transfer (Figs. 12 and 13). The rack plates 26 are each provided with projections 42 for the respective calculating devices. When no transfer is to be made upward movement of the rack plates 26 is stopped by detents 43 swinging from rods 44 and having their lower ends normally in position to be engaged by the projections 42 to prevent transfer movement of the rack plates 26 (Fig. 12). Springs 45 are provided to actuate the detents 43 from the position in which they stop upward movement of the rack plates when no transfer is being made (Fig. 12) to the position in which the shoulders 46 on the detents are placed in line with the projections 42 (Fig. 13), thereby permitting the necessary transfer movement of the rack plates which are required to operate in transferring operations. Latches 47 holding the detents 43 in position to prevent transferring movement of the rack plates 26 have arms 48 extending adjacent to the pinions 36, respectively, and are provided with conical shoulders 49 which ride upon the peripheries of disc portions 50 in connection with the pinions 36. Each of the disc portions 50 is formed with a tripping tooth 51 which in the idle or clear positions of the calculating pinions 36 stand adjacent to the lower edges of the conical shoulders 49 and which when the pinions are turned to the position in which they represent "9" (Figs. 12 and 15) actuate the latches 47 to release the detents 43, permitting the detents 43 to move to position for transfer. The latches 47 are pivotally supported upon rods 52 and are actuated to latching engagement with the detents 43 by springs 53. Extent of movement of the latches 47 of each calculating device by the springs 53 is limited by shoulders 54 on the detents 43 (Fig. 13). Extent of movement of the detents 43 of each calculating device is limited by a rod 55 supported by a pair of arms 56 on the rod 44 (Fig. 30). At the proper time after each transfer movement of the rack plates 26 the arms 56 in the calculating device in which the transfer occurred are operated to raise the rod 55 and thereby operate the detents 43 into latching engagement with the latches 47. This, however, occurs when the rack plates 26 are down and when the pinions 36 are out of engagement with the pinions 34. Normally the arms 56 are held by springs 57 in position in which the rod 55 is a sufficient distance below the arms of the detents 43 to permit movement of the detents from non-transferring to transferring positions (Figs. 12 and 13). An abutment 58 limits movement of the arms 56 by the springs 57 so that the springs 57 and the abutment 58 normally retain the arms 56 in position in which the rod 55 permits release of the detents 43 from the projections 42 on the rack plates 26.

After each transferring operation is completed the detents 43 are restored to position in which their lower ends engage the projections 42 (Fig. 12). This is accomplished by operating the arms 56 in the calculating device in which the transfer operation had been performed, thereby raising the rod 55 and moving the detents 43 in opposition to their springs 45. One of the arms 56 in each calculating device is provided with a stud 59 (Figs. 29 and 30) above which a projection 60 on a link 61 extends. The link 61 is movable and when transfer operations take place is in its raised position in which the springs 57 hold the rods 55 down to permit movement of the detents 43 by their springs 45 (Fig. 29). Next the shaft 15 is operated which in turn operates connections for moving the link 61 in a direction to raise the rods 55 and thereby restore the detents 43 into latched engagement with the latches 47, with the lower ends of the detents 43 in engagement with the projections 42 on the rack plates 26.

The upper end of the link 61 is guided by a stud 62 and slot 63 (Fig. 29), the stud 62 being riveted in the right side frame. The lower end of said link 61 has a roller 64 therein in cam slot 65 formed in a plate 66 attached to a rock shaft 67 (Fig. 21). The shaft 67 is turned with the shaft 15 by a link 68 connecting an arm 69 on the shaft 15 with an arm 70 on the shaft 67. The connection between the link 61 and the cam 65 is such that just prior to completion of the forward turning movement of the shaft 67 the link 61 is moved downwardly, causing the projections 60 thereon to operate the devices for raising the rods 55, thereby restoring the detents 43 to the positions shown in Fig. 12. It is understood that during this operation the racks 4 (Fig. 1) are held from forward movement by the detent plate 16, while the type carriers 5 are permitted a slight forward movement by pin and slot connection 71. This movement is sufficient to cause the devices 22—23 to move the rack plates 26, that had operated in transferring, downwardly a sufficient distance to permit the lower ends of the detents 43 to be placed upon the projections 42. Then on the return movement of the type carriers 5, racks 22 and sliding supports 23, the rack plates 26 are held from movement by the detents 43.

Each operation of the machine comprises movement of mechanisms from and to normal positions. The movement from normal position may be termed the forward stroke, and the return movement to normal position may be termed the return stroke. In the embodiment of the invention shown when performing any example of addition or subtraction, the pinions 36 are disconnected from the pinions 34 during the forward stroke, that is during movement of the rack plates 26 from their normal positions; just as the usual adding pinions 9 are disconnected from the racks 4 during forward movement of said racks when the machine is operated to perform an example of addition or subtraction.

A sliding link 72 (Figs. 1, and 3 to 7 inclusive) has cam surfaces 73. The link 72 is normally held in raised position (Figs. 1, 3 and 5) in which the cams 73 do not interfere with the movement of the pinions 36 into and out of mesh with the intermediate pinions 34. When the link 72 is moved downwardly the cams 73 operate against rollers 74 on the shaft 37, with the result that the pinions 36 are disengaged from the intermediate pinions 34 and are engaged with the locking bars 40. The lower end of the link 72 supports a roller 75 at one side thereof. A plate 76 pivoted on a support 77 has a pair of spaced cam projections 78 on its lower end and detent receiving notches 79 in its upper end, the latter receiving a detent roll 80 on an arm 81 actuated by a spring 82 whereby the cam is held in its different adjusted positions. During the forward stroke of the machine one of the cam projections 78 is in engagement with the roller 75, thereby holding the sliding link 72 downwardly in position in which the cams 73 thereon engage the rolls 74 and hold the pinions 36 out of engagement with the pinions 34. At the beginning of the return stroke the cam 76 is operated so that the roll 75 may enter the space between the cam projections 78 and thereby permit the link 72 to be raised by its actuating spring 83. An arm 84 attached to the shaft 67 supports a pawl 85 actuated toward one position by a spring 86 having two oppositely formed shoulders 87 and 88. A tridental lever, comprising a lower arm 89, an upper arm 90 and a third arm 91, is mounted on the pivot 77. The arm 89 has a projecting pin 92 and the arm 90 has a projecting pin 93. A plate 94 is mounted for sliding movements between the tridental lever and the cam plate 76, being guided by the pivot 77 extending through a slot 95 in the sliding plate and by another pin and slot device 96. A pin 97 on the arm 91 projects into a cam slot 98 in the sliding plate 94.

When the machine is normal and ready for operation to perform the calculations the parts occupy the relative positions shown in Fig. 3, in which the link 72 is up and the detent roll 80 in the middle notch 79. At the beginning of the forward turning movement the rock shaft 67 the shoulder 87 of the pawl 85 engages the pin 92, thereby immediately turning the cam plate 76 to the position shown in Fig. 4 during the movement to which position the link 72 was lowered, causing the cams 73 to disconnect the pinions 36 of each calculating device from the intermediate pinions 34. The cam plate 76 is latched in this position by the detent 80. Continued forward turning movement of the shaft 67 carries the shoulder 87 out of engagement with the pin 92 and the end portion of the pawl 85 contacts with the pin 93 as shown in Fig. 4, which illustrates the position of these parts when the shaft 67 is at the end of its forward turning movement. At the beginning of the return stroke the shoulder 88 engages the pin 93 and restores the cam plate 76 to the position shown in Fig. 3, in which the roll 75 is between the cams 78. The link 72 is quickly raised to release the cams 73 from the rolls 74, permitting the pinions 36 to be moved by the springs 41 into mesh with the intermediate pinions 34. This occurs before any turning movement is imparted to the pinions 34 on the backward stroke of the machine, so that the pinions 36 will be turned distances corresponding to the value of the digits to be represented thereby, transferring operations being performed as before described. During these operations the plate 94 is held in its raised position by a spring 99.

To print a total or any number represented by the pinions 36 of either calculating device and to leave the pinions 36 in a clear condition, it is necessary to retain them in mesh with the intermediate pinions 34 on the forward stroke and out of mesh on the return stroke. When a subtotal is to be printed, however, the pinions 36 remain in mesh with the pinions 34 on both forward and return strokes. To obtain these operations connections are provided under control of the total key 18 to hold the pinion 36 in mesh with the pinions 34 during the forward stroke and out of mesh therewith during the return stroke; and connections are provided under control of the subtotal key 100 (Figs. 1 and 31) for retaining the pinions 36 in mesh with the pinions 34 during both the forward and return stroke. A link 101 has its forward end pivoted to a rocker arm 102 attached to the rock shaft 19. The subtotal key 100 has a pin 100ᵃ in front of the arm 102 for operating the same and other parts connected with the key 18 which is attached to the shaft 19. This construction is such that when the total key 18 is operated inwardly, that is rearwardly, the upper end of the arm 102 is swung rearwardly, leaving the subtotal key 100 stationary. The rear end of the link 101 has a slot 103 (Fig. 3) through which a pin 104 on an arm 105 extends. The rear end of the link 101 has a notch embracing a pin 106 on an arm 107 pivoted on a shaft 108 and actuated rearwardly by a spring 109. The link 101 normally holds the arm 107 forward, but when said link 101 is pushed rearwardly it cooperates with the spring 109 to move the arm 107 rearwardly. The arm 107 is in connection with another arm 110 which operates upon a roll 111 on the sliding plate 94. Thus, when the link 101 is moved rearwardly the arm 110 pushes the plate 94 downwardly to the position shown in Fig. 5. In this position the pin 97 and the slot 98 hold the tridental lever 89—90—91 in position in which the shoulder 87 will not engage the pin 92 during the forward stroke. This leaves the pinions 36 in mesh with the pinions 34. It is known that the total key 18 will remain in its depressed or rearward position during both the forward and return strokes. At the beginning of the return stroke with the total key 18 depressed or rearward and the arm 110 down (Fig. 5) the shoulder 88 will engage the pin 93 and thereby operate the tridental lever, thus moving the cam plate 76 to cause one of the cams to operate against the roll 75 and lower the link 72, the parts being moved to the positions shown in Fig. 7. Thus the pinions 36 are disengaged from the pinions 34 while in their clear positions, and are held out of engagement with the pinions 34 during the return stroke thus leaving them in a clear condition.

The link 112 (Figs. 1 and 31) has its forward end pivoted to the subtotal key connection 100 and its rear end connected by a pin and slot connection 113 with a lever 114 on the shaft 115 (Fig. 6). Operation of the subtotal key 100 moves the lever 114 to the position shown in Fig. 6, although Fig. 6 shows the link 112 in its normal position with the lever 114 held in position there shown by the non-adding connections hereinafter described. The upper end of the lever 114 is connected by a link 116 with a lever 117 on the shaft 108. Toward the end of the forward stroke a cam-like portion 118 on the pawl 85 operates against a pin 119 on the lever 117 and raises the pawl 85 to the position shown in Fig. 6. When the back stroke begins the pin 119 holds the pawl 85 in such position that the shoulder 88 of said pawl will miss the pin 93, thereby leaving the pinions 36 in mesh with the pinions 34 during the return stroke.

The machine includes means for preventing operation of any of the special calculating devices during the taking of a total from the usual adding pinions 9, or whenever it is desired to use the machine without operating any of the special calculating devices. A key lever 120 (Figs. 31 and 32) pivoted on the shaft 19 is connected with the forward end of a link 121 which is moved forwardly when the lever 120 is depressed. The rear end of the link 121 is pivoted to a lever 122 (Figs. 3 and 6) attached to the shaft 115. The lever 122 is in connection with the arm 105 so that when the link 121 is moved forwardly by operation of the key 120 the arm 105 raises the rear end of the link 101 out of engagement with the pin 106. A projection 123 on the lever 114 is engaged by the arm 105 when the latter moves forwardly. The lever 114 is thereby operated to position shown in Fig. 6, these connections being the non-adding connections that adjust the parts to position shown in Fig. 6 as above mentioned. This movement of the lever 114 places the pin 119 in position to disable the pawl 85, thereby leaving the link 72 in lower adjustment, in which the cams 73 hold the pinions 36 out of mesh with the pinions 34 during both the forward and return strokes. By this means a total may be taken from the pinions 9, or the machine may be operated to use the pinions 9 without operating any of the special calculating devices. The lever 120 is latched in its depressed position by a pin 124 engaging a latch pawl 125 controlled by a spring 126. A pivoted trip 127 supported by the shaft 15 releases the latch 125 from the pin 124 during the return stroke. This, however, leaves the links 72 holding the pinions 36 inoperative.

I will now describe the mechanism for shifting the pinions 33 from the racks 28 which they engage during adding operations (Fig. 14) to the racks 27 which they engage during subtracting operations (Fig. 16). In both operations the pinions 33 remain in engagement with the pinions 34. A key lever 128 (Figs. 31 and 32) pivoted on the shaft 19 has an upward extension 129 to which the forward end of a link 130 is pivoted so that when the key lever 128 is depressed the link 130, is moved forwardly. The rear end of the link 130 (Figs. 18, 19 and 35) is pivoted to an arm 131 attached to a shaft 132. An arm 133 on the lower end of the shaft 132 has pin and slot connection 134 with one end of a slide 135, the opposite end of which operates in a support 136. The slide 135 has a notch 137 receiving a projection 138 from a clutch member 139 mounted for sliding movements on a shaft 140. A bell crank lever 141 is rigid on the sliding clutch 139, the lower arm supporting at its side a roll 142 and the other arm supporting at the opposite side a roll 143. A bracket 144 supports a lever 145 of the first class having yoke connection 146 (Figs. 18 and 20) with the shaft 32 on which the pinions 33 are mounted. The lower end of the lever 145 has a roll 147 operating in a cam slot 148 in a formed part of a slide 149 movable vertically by a lever 149$^a$ attached to the shaft 140 and pivotally connected to the link 149 at 149$^b$ (Fig. 19). Rocking of the shaft 140 therefore moves the shaft 32 axially to shift the pinions 33 from the racks 27 to the racks 28, and vice versa. The shaft 140 has rigid thereon a clutch member 150 engaging the clutch member 139.

A plate 151 is supported for sliding movements by the support 136 and studs 152 and is actuated downwardly by a spring 153 (Figs. 8 and 35). The slide 151 supports a roll 154 which is engaged by the raised portion 155 on the slide 135 when the latter is in position to leave the pinions 33 in engagement with the racks 28. The slide 151 is thereby held in its upper position in opposition to the spring 153. A projection 156 in the upper end of the slide 151 is in line with a projecting finger 157 on the rear end of the link 20 which also has another finger 158 above the plane of the finger 157 (Figs. 8, 10 and 11). A lever 159 of the first class is fulcrumed at 160 and has a projection 161 on its lower end engaging in a cam slot 162 in a projecting part of the slide 149. The upper end of the lever 159 engages a yoke 163 of an arm 164 mounted for sliding movements on a support 165 (Figs. 26 and 27). The arm 164 is a locking device for the total mechanism and is capable of adjustment in four different positions with respect to the projecting fingers 157 and 158. These four positions are: First, when using the machine for straight addition with the pinions in mesh with the racks 27, the arm 164 is below the plane of the finger 158 and out of line with the finger 157, leaving the keys 18 and 100 free to operate; second, when the pinions 33 engage the racks 28 prior to rotation in subtraction the arm 164 is in line with the finger 157 (Fig. 11) preventing movement of the link 20 by the keys 18 and 100; third, with the pinions 33 in mesh with the racks 28 and after rotation of said pinions 33 in subtraction, the arm 164 is held up above the plane of the finger 157 and out of line with the finger 158, said arm being raised as hereinafter explained in describing the structure shown in Fig. 8 in the description of subtraction; fourth, after being operated in subtraction and containing a negative total the pinions 33 will shift from the racks 28 to the racks 27 (unless the subtraction key 128 be held down) and such shifting moves the arm 164 into line with the finger 158 and this prevents operation of either key 18 and 100 until the subtraction key 128 be depressed to move the pinions 33 into engagement with the racks 28 and incidentally move the arm 164 out of line with the finger 158 and above the plane of the finger 157. Then, with the key 128 held down, either the key 18 or 100 may be operated to print the negative total.

When the key lever 128 is depressed the link 130 moves forwardly turning the shaft 132, moving the slide 135 and thereby the sliding clutch member 139 and the lever 141. This movement of the lever 141 carries the roll 142 out of line with the cam 66 (Fig. 18) and places the roll 143 in line with a cam plate 166 on the shaft 67. Then at the beginning of the forward turning movement of the shaft 67 the cam 166 operates the lever 141 to turn the shaft 140 and operate the lever 149. The lever 149 operates the lever 145 to the position shown (Fig. 18), moving the pinions 33 from the racks 28 to the racks 27. At the same time the raised part 155 of the slide 135 (Fig. 35) raises the slide 151 till the projection 156 engages the finger 157 and raises the link 20 from operative to inoperative or locked position. The pinions 33 will be held in mesh with the racks 27 as long as the subtraction key lever 128 remains depressed, but when said key lever 128 is raised to its normal position the link 130 moves rearwardly restoring the slide 135 to its normal position, permitting the spring 153 to lower the slide 151, whereupon the end of the link 20 supporting the fingers 157 and 158 drops to operative position. This movement of the slide 135 moves the clutch member 139 axially, taking the roll 143 out of line with the cam 166 and placing the roll 142 in line with the cam 66.

The next forward turning movement of the shaft 67 operates the cam 66 against the roll 142 on the lever 141 thereby turning the shaft 140 and operating the arm 149, which in turn operates the lever 145 moving the shaft 32 axially to place the pinions 33 in mesh with the racks 28 for adding operations.

Upon the taking of a total, whether a positive total or a negative total, it is necessary to stop rotation of the pinions 36 in their clear position, that is it is necessary to stop rotation of said pinions when the tripping teeth 51 engage the shoulders 49. This result is obtained by locking the latches 47 in engagement with the detents 43. For this purpose a locking bar 167 (Figs. 1, 28 and 29) extends above each series of latches 47 and is normally held in released position (Fig. 29) by a link 168 engaging a pin 169 on an arm 170 in connection with one end of the locking bar. When either the total key 18 or the subtotal key 100 is operated the link 168 is raised, permitting the spring 171 to turn the locking bar 167 to position to prevent operation of the latches 47 when the tripping teeth 51 engage the shoulders 49.

The lower end of the link 168 pivotally supports a latch member 168$^a$ (Fig. 36). A lever 168$^b$ attached to the arm 110 has operative connection 168$^c$ with the latch member 168$^a$. As before stated the arm 110 is swung downwardly when either the total key or the subtotal key is operated as a result of which the lever 168$^b$ moves the latch member 168$^a$ into engagement with a projection 168$^d$ on a lever 168$^e$ pivoted on a support 168$^f$. A roller 168$^g$ on the lever 168$^e$ rides on the cam 66. At the beginning of the forward turning movement of the shaft 67, after the total or subtotal key has been operated and the latch 168$^a$ engaged with the projection 168$^d$, the link 168 will be raised and the springs 171 will turn the locking bars 167 to positions to prevent release of the latches 47 from the detents 43 (Fig. 28). Upon return of the total or subtotal key to normal position the arm 110 operates the connections described to release the latch 168$^a$ from the projection 168$^d$ permitting the link 168 to move down and disengage the locking bars 167 from the latches 47 (Fig. 29).

Figure 2:
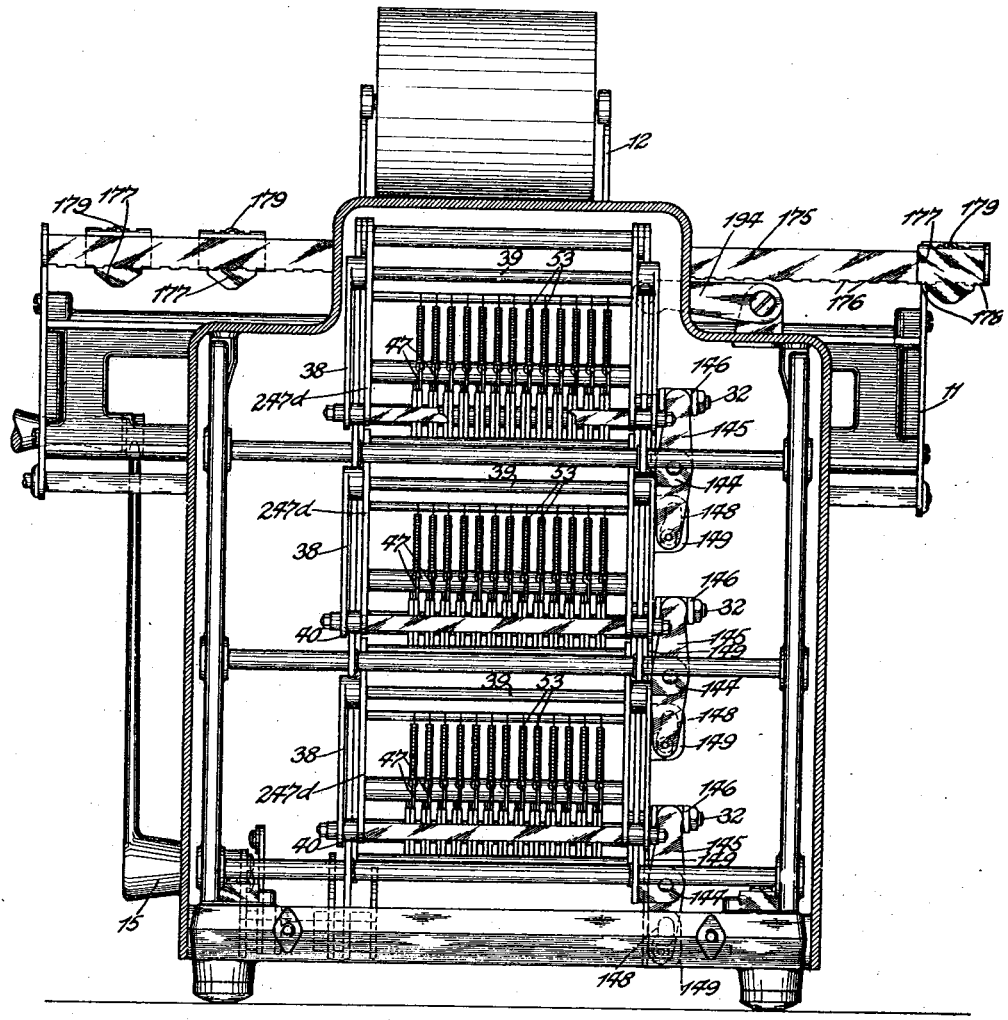
Fig. 2 is a rear elevation of the operating mechanism, the case of the machine being shown in section.

I will now describe the mechanism under control of the paper carriage 11 for controlling the operation of the respective special calculating devices. There are four bars 172—173—174 and 175 supported by and running the full length of the paper carriage (Figs. 1, 2 and 22). Of these the bar 172 is for use in subtracting operations; the bar 173 controls the lower calculating device when the machine is used in adding or non-adding operations; the bar 174 controls the middle special calculating device when the machine is used in adding or non-adding operations, and the bar 175 controls the upper special calculating device when the machine is used in adding or non-adding operations. These bars have notches 176 in their lower edges, and each bar is provided with one or more adjustable cams 177. The cams 177 have bent portions 178 for engagement in the notches 176. Springs 179 (Fig. 25) hold the cams in position in which the parts 178 engage in the notches 176. When it is desired to adjust the cam along the bar on which it is mounted, the cam is simply pressed downward far enough to disengage the parts 178 from the notches 176 to permit the cam to slide along the bar. There is a vertical slide for each of the four bars 172—173—174 and 175. The slide 180 cooperates with the cam on the bar 172; the slide 181 cooperates with the cam on the bar 173; the slide 182 cooperates with the cam on the bar 174, and the slide 183 cooperates with the cam on the bar 175.

Each of the slides 181—182 and 183 is pivotally connected with a cooperating rocking lever, of which the lever 184 is pivoted to the slide 181; the lever 185 is pivoted to the slide 182 and the lever 186 pivoted to the slide 183, said rocking levers being pivoted upon a support 187. The rear end of the lever 184 is pivotally connected with the sliding link 188; the lever 185 is pivotally connected with a sliding link 189 and the lever 186 is pivotally connected with a sliding link 190 (Figs. 22 and 23). Arms 191, 192 and 193 are pivotally connected to the links 188, 190 and 189 respectively. The normal position of the arms, 191, 192 and 193 is that in which they constitute abutments for the shaft 37 to hold the pinions 36 out of engagement with the pinions 34 (Fig. 22), the arm 191 being shown in position to permit meshing of the pinions 36 with the pinions 34. A series of four pivoted arms 194 rest upon the upper ends of the slides 180, 181, 182 and 183, respectively, having rollers 195 for engagement by the cams 177. When one of the cams 177 depresses its cooperating arm 194 a corresponding slide 181, etc., is moved downward and, by the train of connections described, will raise the corresponding link 188, 189 and 190. In the case of the links 189 and 190 they will raise the arms 193 and 192, respectively, to position to permit meshing of the pinions 36 with the pinions 34, whereas raising of the link 188 will place the arm 191 in position to prevent the meshing of the pinions 36 in the lower calculating device with the pinions 34. Springs 196 hold the arms 191. 192 and 193 in proper relation to their respective links. For subtracting operations the link 180 has pivotal connection 197 with an arm 198 on a shaft 199 (Fig. 35). An additional arm 200 is attached to the shaft 199 (Figs. 22 and 35) and has pin and slot connection 201 with one end of a link 202, the pin and slot connection being held in proper relationship by a spring 203. The link 202 has slot pivot connection 204 (Figs. 18. 22, 24 and 35) with an arm 205 attached to the shaft 132. When the cam 177 on the bar 172 operates the arm 194 controlling the slide 180, the said slide 180 is moved and, by the train of connections described, the shaft 132 will be turned, thereby operating the train of connections for shifting the pinions 33 from the racks 28 to the racks 27, just as said pinions are shifted by operation of the connections controlled by the key lever 128 previously described.

I will now describe the mechanism for shifting the bi-chrome ribbon to position in which the totals may be printed in a color distinctive from the color in which the listed items in added totals are printed. This mechanism is shown in Fig. 32 and as there shown the key lever 128 has an extension 206. An arm 207 attached to the shaft 208 has operative connection 209 with the key lever 128 and its extension 206. An arm 210 attached to the shaft 208 is pivoted to the front end of a link 211, the opposite end of which is supported for sliding movements by a support 212. The link 211 has an arm 213 engaging behind the pin 214 on a link 215. By these connections when the lever 128 is in its idle or raised position the link 215 is held in its forward position. The link 215 is pivotally supported by an arm 216 pivoted at one end on the shaft 217. The opposite end of the arm 216 engages a ribbon guide 218 for holding the inking ribbon in proper position for printing operations. The link 20 has a projection 219 which also retains the link 215 in position. A shaft 220 has a bell crank lever device 221 attached thereto, one arm supporting a pin 222 and the other arm being pivoted to a link 223 operatively connected to the main operating shaft 15. When the key lever 128 is depressed it moves the slide 211 toward the rear, taking the arm 213 away from the pin 214 on the link 215. When either total key 18 or the subtotal key 100 is operated to move the link 20 toward the rear, the pin 219 is moved away from the link 215. The link 215 is actuated by a spring 244 into contact with the pin 222. When the shaft 220 is turned forwardly by the connections with the main shaft 15, the pin 222 is raised into contact with the shoulder 225 on the link 215, and continued upward movement of the pin 222 raises the link 215, thereby raising the ribbon guide 218 until a distinctive color of the ribbon is positioned for printing. As the key lever 128 is not operated when printing a positive total, the pin 222 cannot engage the shoulder 225, so that positive totals will be printed in the same color as the listed items.

The operation of the special calculating devices may be selectively controlled independently of the paper carriage by mechanism shown in Figs. 33 and 34. As shown key levers 226, 227 and 228 are pivoted upon the shaft 19. The forward end of links 229 are pivoted to the key levers 226, 227 and 228, respectively, and the rear ends of said links are pivoted to the lower arms of corresponding bell crank levers 230 pivoted on a shaft 231. Links 232 have their lower ends pivoted to the levers 230 respectively, and their upper ends provided with pin and slot connection 233 with the levers 184, 185 and 186, respectively. Thus the key lever 226 is operatively connected with the lever 182, the key lever 227 with the lever 185 and the key lever 228 with the lever 186. This connection permits the levers 184, 185 and 186 to be operated by the paper carriage independently of the key levers 226, 227 and 228, and vice versa. Thus the operation of the respective special calculating devices may be controlled by the paper carriage in its different columnar adjustments, or may be independently controlled from the keyboard, as desired.

A latch plate 234 pivoted on a support 235 and controlled by a spring 236 has a slot 237 for engaging shoulders 238 on the key levers 226, 227 and 228 to hold said key levers in their depressed positions. These key levers operate on the flexible release principle, whereby movement of either key lever to latching engagement with the plate 234 releases either of the other key levers from latching engagement with said plate.

A negative total is the result of subtracting a larger amount from a smaller one to show a deficit in an account, for instance. This negative total can be obtained by the familiar process of utilizing complementary numbers. By the use of the present invention a true negative total, for instance an overdraft in a bank account, may be obtained. As before described, in using the machine for subtracting, that is in obtaining a negative total, the subtraction key lever 128 is held depressed, with the result that the pinions 33 are in mesh with the racks 27, turning the pinions 36 in the direction indicated by the arrow in Fig. 17, which is the opposite direction from which they are turned in ordinary addition. Assuming that the machine is being operated to obtain a negative total, by subtracting a larger amount from a smaller one, provision may be made for the addition of one unit in the units column.

The bell crank lever 141 has a cam face 239 (Fig. 8) which passes over a roll 240 supported at one side of the lower arm of a bell crank lever 241 pivoted on the pinion shaft 32. The opposite arm of the bell crank lever 241 has a projection 242 extending under a projection 243 on the latch 47 for the detent 43, holding the rack plate 26 in units numerical order. Thus, if the latch 47 in units numerical order be released from the detent 43 that holds the rack plate 26 in units numerical order, an additional unit will be added by the pinion 36 in units numerical order. A pivoted latch member 244 (Fig. 9) is held in place by a spring 245. An arm 246 is pivoted on the intermediate pinion shaft 35 and actuated in one direction by a spring 247 (Fig. 8). By pin-in-slot construction 247$^a$ a plate 247$^b$ is supported for sliding movements on a comb plate 247$^c$ between the teeth of which the tails of the latches 47 operate. The side frame part 247$^d$ guides and prevents the plates 247$^b$ from turning on its support. When the cam point 239 operates the lever 241 to release the latch 47 for the rack plate 26 in units denominational order, which occurs on forward turning of the shaft 67 in making a subtracting operation, the spring 245 moves the lower part of the latch member 244 over the tail of the latch 47 and holds the latch 47 released until the shaft 67 on its return stroke approaches its starting point; and as the shaft 67 approaches its starting point the arm 246 is operated to raise the plate 247$^b$ which has engagement 247$^e$ with the latch 244. This upward movement of the plate 247$^b$ releases the latch 244 from the latch 47. The arm 246 is operated near the final movement on return of the shaft 67 by the projection 256 on the cam 166 engaging and operating said arm 256 (Fig. 8).

A total locking plate 248 is pivoted on a support 249 and is held in its two adjusted positions by a one-toothed gear 250 (Figs. 26 and 27) which is fastened to a pinion 251. The pinion 251 is rigid with the adjacent intermediate pinion 34 of the calculating device. A pair of pawls 252 and 252$^a$ are pivotally supported by the locking plate 248 and are connected above their pivots by a spring 253. The inner end of the shaft 165 supports an arm 254 and has a roll 255 bearing on the periphery of the locking plate 248.

The parts just described come into operation when shifting from adding to subtracting operations, and vice versa. When the shaft 67 starts its forward turning movement with the subtracting key 100 depressed, the cam 166 engages the roll 143, causing the cam surface 239 on the bell crank lever 141 to pass over the roll 240. The projection 242 (Fig. 8) raises the units latch 47, with the result that the detent 43 holding the units rack plate 26 moves to position to permit a transfer operation. When the shaft 67 returns to its normal position the rack plate 26 in units denominational order in the lower special calculating device stops in the position shown in Fig. 13. At the same time a projection 256 (Fig. 8) on the cam 166 contacts with the arm 246 moving it to a position where the auxiliary latch 244 will release the units latch 47. In this way an additional unit is introduced into the pinion 36 in the units denominational order. The one-toothed gear 250, being directly connected to the last pinion 34, is moved one tooth. Thus the single tooth on the one-toothed gear 250 is caused to come into contact with the pawl 252 turning the locking plate 248 to the position in which the cam 257 (Fig. 26) raises the arm 254, thereby placing the arm 164 in line with the finger 158 and breaking the lock of the total key mechanism that was set up when the subtraction key 100 was depressed, it being remembered that such lock was set up by raising the finger 157 in line with the arm 164. This leaves the total key 18 and its co-operating mechanism free to operate to print the negative total obtained as described.

The invention is capable of wide variation in construction and relationship of parts without departure from the nature and principle thereof. I do not restrict myself unessentially in the foregoing or other particulars, but contemplate such alterations and modifications within the scope of the appended claims as may be found advisable.

I claim:

1. A calculating machine comprising mechanism operating on a forward and return stroke, a series of calculating pinions, means for rotating said pinions in either one of two directions on the return stroke of said mechanism, and transfer mechanism controlled by said pinions to cause parts of said means to operate to transfer from lower to higher denominational orders irrespective of the direction of rotation of said pinions.

2. A calculating machine comprising mechanism operating on a forward and return stroke, a series of calculating pinions, means for rotating said pinions in either one of two directions on the return stroke of said mechanism, transfer mechanism controlled by said pinions to transfer from lower to higher denominational orders irrespective of the direction of rotation of said pinions, and means for locking said transfer mechanism when the machine is operated to indicate a total.

3. A machine of the character described comprising mechanism operating on a forward and return stroke, a series of laterally shiftable pinions, racks with which said pinions may be selectively meshed and rotated optionally in either direction, a series of calculating pinions operated by said first named pinions in any position thereof, and transfer mechanism controlled by said calculating pinions for transferring from lower to higher denominational orders irrespective of the direction of rotation of said calculating pinions.

4. A machine of the character described comprising mechanism operating on a forward and return stroke, a series of laterally shiftable pinions, racks with which said pinions may be selectively meshed and rotated optionally in either direction, a series of calculating pinions operated by said first named pinions in any position thereof, transfer mechanism controlled by said calculating pinions for transferring from lower to higher denominational orders irrespective of the direction of rotation of said calculating pinions, and means for locking said transfer mechanism during the taking of a total.

5. A calculating machine comprising mechanism operating from and to a starting position, a series of calculating pinions operated by said mechanism during return movement of said mechanism to its starting position, means for selectively changing the direction of rotation of said pinions by said mechanism during return of said mechanism to its starting position, and transfer devices operated by said pinions in either direction of rotation.

6. A calculating machine comprising a series of pairs of racks, mechanism for reciprocating said racks, a series of pinions, means for meshing said pinions with the different racks of said pairs of racks selectively, a series of calculating pinions under control of said first named pinions and operated thereby to perform calculations in different directions of rotation, and transfer devices controlled by said calculating pinions.

7. A calculating machine comprising a series of rack plates, a pair of racks on each plate, pinions movable to engagement with selected racks, intermediate pinions in permanent engagement with said first named pinions, a series of calculating pinions movable into and out of engagement with said intermediate pinions, transfer elements limiting movement of said rack plates, and means operated by said calculating pinions for operating said transfer elements to permit transfer operation of said rack plates.

8. A machine of the character described comprising a series of laterally shiftable pinions, racks with which said pinions may be selectively engaged, key mechanism for shifting said pinions to engage said racks selectively, a series of calculating pinions, means for operating said calculating pinions by said first named pinions in either position of said first named pinions, and transfer mechanism controlling transfer movements of said racks.

9. A calculating machine comprising a series of calculating pinions, mechanism for rotating said pinions in one direction during adding operations and in the reverse direction during subtracting operations, and transfer mechanism controlled by said pinions to cause parts of said mechanism to operate said pinions in either direction of rotation.

10. A calculating machine comprising a series of calculating pinions, mechanism for rotating said pinions in one direction during adding operations and in the reverse direction during subtracting operations, transfer mechanism controlled by said pinions to cause parts of said mechanism to operate said pinions in either direction of rotation, and means for automatically effecting a transfer of 1 to units calculating pinion in subtracting operations.

11. A calculating machine comprising a series of pinions, mechanism for rotating said pinions, a series of calculating pinions movable into and out of engagement with said first named pinions, transfer elements controlled by said calculating pinions in either direction of rotation, and means for locking said transfer elements against operation.

12. A calculating machine having a forward and return stroke and comprising a series of laterally movable pinions, a set of racks meshing with said pinions in one position of the pinions, a diametrically opposite set of racks meshing with the pinions in another position of the pinions, a series of calculating pinions operated by said first named pinions in either position thereof, and transfer elements controlled by said calculating pinions to permit said first named pinions to operate said calculating pinions in transfer operations.

13. A calculating machine comprising a series of racks, mechanism for reciprocating said racks, pinions meshing with said racks, pivoted detents limiting movement of said racks in one direction, latches holding said detents in position to limit movement of said racks, a series of intermediate pinions in permanent mesh with said first named pinions, a series of calculating pinions movable into and out of engagement with said intermediate pinions, and means operating with said calculating pinions to release said latches from said detents to make transfer.

14. A calculating machine comprising two sets of racks, a set of laterally shiftable pinions engageable with the racks of either set selectively, a set of intermediate pinions meshing with said first named pinions, a set of calculating pinions movable into and out of engagement with said intermediate pinions, and means under control of said calculating pinions permitting operation of said racks to make transfer.

15. A calculating machine comprising a series of reciprocating slides, a number of series of racks supported by said slides, series of pinions meshing with the series of racks, a series of intermediate pinions meshing with each series of said first named pinions, transfer elements limiting movement of said racks respectively, a series of calculating pinions operated by each series of intermediate pinions, and means operated by said calculating pinions controlling said transfer elements.

16. A calculating machine comprising a series of reciprocating racks, a series of pinions meshing with the racks, a series of intermediate pinions meshing with said first named pinions, calculating pinions operated by said intermediate pinions, detents limiting movement of said racks in one direction, latches for said detents, and means operated by said calculating pinions for releasing said latches from said detents.

17. A calculating machine comprising a series of pivoted racks, mechanism for oscillating said racks, a series of slides operated by said racks, a rack supported by each slide, calculating pinions, means operated by said second racks for operating said calculating pinions, and means controlling transfer operations of said second racks.

18. A calculating machine comprising a series of pivoted arms, a series of slides operated by said arms, a series of racks mounted on said slides, calculating pinion, means operated by said racks for rotating said calculating pinions in either direction during the return movement of said racks to their starting positions, and means under control of said calculating pinions controlling transfer operations of said racks.

19. A calculating machine comprising two series of racks, a series of laterally shiftable pinions, means for shifting said pinions into mesh with either series of racks as desired, calculating pinions operated by said first named pinions in either position of said first named pinions, and means for controlling said racks in transfer operations.

20. A calculating machine comprising a plurality of series of pairs of racks, calculating pinions, means operated by said racks for selectively rotating said calculating pinions in either direction during return movement of said racks to their starting positions to perform straight addition or direct subtraction, as desired, and transfer mechanism controlled by said calculating pinions when rotating in either direction.

21. A calculating machine comprising elements moving on a forward and return stroke when operated, a series of calculating pinions, mechanism operated by said elements on their return stroke for rotating said pinions in one direction during addition and in another direction during subtraction, and transfer mechanism controlled by said pinions irrespective of the direction of their rotation.

22. A calculating machine comprising elements movable from and to a starting position a series of calculating pinions, mechanism operated by said elements for rotating said pinions in one direction during addition and in another direction during subtraction during movement of said elements to starting position, transfer mechanism controlled by said pinions irrespective of the direction of their rotation, recording mechanism for recording the items and results, and automatic means for causing the recording mechanism to record negative totals in a color distinctive from the color in which positive totals are recorded.

23. A calculating machine comprising a series of calculating pinions, mechanism moving from and to a starting position, means operated by said mechanism for rotating said pinions in either direction during return of said mechanism to its starting position, devices for causing said means to operate said pinions in transferring operations, and differential stops controlling the operation of said mechanism.

24. A calculating machine comprising differential stops, a plurality of series of pairs of racks, mechanism under control of the differential stops for operating said racks, calculating pinions, devices driven by said racks selectively for operating said calculating pinions during return movement of said racks to their starting positions, and means under control of said calculating pinions controlling operation of said racks in transfer movements.

25. A calculating machine comprising a series of calculating pinions, racks, means for operating said racks, means operated by said racks for operating the calculating pinions, detents limiting movement of said racks to their starting positions, means under control of said calculating pinions for releasing said detents to permit movement of said racks beyond their starting positions, and means for re-positioning said detents to limit movement of said racks to their starting positions.

26. A calculating machine comprising a series of slides, a number of series of racks movably supported by said slides, a series of pinions for each series of racks, a series of calculating pinions corresponding to each series of said first named pinions, means driven by said first named pinions for rotating said calculating pinions in either direction during return movement of said racks to their starting positions, and transfer devices controlled by said calculating pinions controlling transfer operations of said racks.

27. A calculating machine comprising calculating pinions, mechanism for rotating the calculating pinions in both directions in calculating and transferring operations, and transfer controlling elements controlled by the calculating pinions to cause parts of said mechanism to operate said pinions in transferring operations irrespective of the direction of rotation.

28. A calculating machine comprising calculating pinions, mechanism for rotating the calculating pinions in both directions in calculating and transferring operations, elements preventing transfer operation of said mechanism until a transfer is to be made, and means operated by the calculating pinions irrespective of their direction of rotation permitting transfer operation of said mechanism when transfer is to be made.

29. A calculating machine comprising calculating pinions, mechanism for rotating the calculating pinions in both directions in calculating and transferring operations, elements preventing transfer operation of said mechanism until a transfer is to be made, means operated by the calculating pinions irrespective of their direction of rotation permitting transfer operation of said mechanism when transfer is to be made, and means adjustable to prevent or to permit said calculating pinions to be operated, as desired.

30. A calculating machine comprising separate series of calculating pinions, mechanism for rotating said calculating pinions in both directions in calculating and transferring operations, transfer means controlled by said calculating pinions to cause parts of said mechanism to operate said pinions in transferring operations irrespective of their direction of rotation, and means for preventing certain of said series of calculating pinions from operating when another series is operated.

31. A calculating machine comprising different series of calculating pinions, mechanism for rotating said pinions in one direction for addition and in the other direction for subtraction, and transfer mechanism controlled by said pinions for causing parts of said first-named mechanism to operate said pinions in transferring irrespective of the direction of rotation of said pinions.

32. A calculating machine comprising different series of calculating pinions, mechanism for rotating said pinion in one direction for addition and in the other direction for subtraction, transfer mechanism for operating said pinions in transferring irrespective of the direction of rotation of said pinions, and means operated by the calculating pinions irrespective of their direction of rotation controlling the operation of said transfer mechanism.

33. A calculating machine comprising mechanism operating from and to a starting position, series of calculating pinions, mechanism for rotating said pinions in one direction for addition and in the opposite direction for subtraction during movement of said mechanism to its starting position, and means under control of said calculating pinions for causing parts of said second-named mechanism to operate said pinions irrespective of the direction of rotation for transferring from lower to higher denominational orders.

34. A calculating machine comprising two series of reciprocating racks, a series of pinions movable into engagement with either series of racks as desired, calculating pinions under control of said first named racks irrespective of which series of racks the first named pinions engage whereby said calculating pinions are rotated in one direction when said first named pinions engage one series of racks and are rotated in the opposite direction when said first named pinions engage the other series of racks, and means under control of said calculating pinions controlling transfer operation of said racks irrespective of the direction of rotation of said calculating pinions.

35. A calculating machine comprising a series of calculating pinions, mechanism for rotating said pinions in one direction for addition and in the opposite direction for subtraction during the return movement of said mechanism to its starting position, devices controlled by said pinions controlling transfer operations of parts of said mechanism, and mechanism acting upon said calculating pinions to obtain a correct negative total in subtraction automatically and as an incident to the return of said operating mechanism to its starting position.

36. A calculating machine comprising two series of reciprocating racks, a series of pinions movable into engagement with either series of racks, as desired, whereby said pinions will be rotated in one direction by one series of racks, and in the opposite direction by the other series of racks during return movement of said racks to their starting position, a series of calculating pinions under control of said pinions, irrespective of which series of racks said first named pinions engage, and devices controlled by said calculating pinions controlling transfer operations of said two series of racks.

37. A calculating machine comprising two series of reciprocating racks, a series of pinions movable into engagement with either series of racks as desired, whereby said pinions will be rotated in one direction by one series of racks and in the opposite direction by the other series of racks during return movement of said racks to their starting position, a series of calculating pinions under control of said pinions irrespective of which series of racks said first named pinions engage, and transfer mechanism controlled by said calculating pinions irrespective of their direction of rotation.

38. A calculating machine comprising a series of calculating pinions, mechanism for rotating said pinions in one direction for addition and in the opposite direction for subtraction during the return movement of said mechanism to its starting position, and said mechanism acting upon said calculating pinions to obtain a correct negative total in subtraction automatically and as an incident to the return of said operating mechanism to its starting position, said last named mechanism comprising means for transferring one to the calculating pinions in units denominational order.

39. A calculating machine comprising a series of elements arranged in denominational orders, mechanisms for operating said elements on a forward and return stroke, series of calculating pinions, a series of racks supported by said elements for each series of calculating pinions, mechanism controlling operation of each series of calculating pinions by the corresponding series of racks and operating said series of calculating pinions simultaneously or selectively as desired, and devices controlled by each series of calculating pinions controlling transfer operations of the corresponding series of racks.

40. A calculating machine comprising differential mechanism, racks controlled by said differential mechanism, adding pinions operated by said racks, a series of additional racks, mechanism controlled by said first racks for operating said additional racks, a series of calculating pinions operated by said additional racks, and means controlled by said calculating pinions controlling transfer operations of said additional racks.

41. A calculating machine comprising a number of series of racks operative on forward and return strokes, differential mechanism, mechanism controlled by said differential mechanism for operating said series of racks, a series of calculating pinions controlled by each series of racks, means for determining which series of calculating pinions will be operated when said racks are operated, and means for controlling transfer operations of said racks.

42. A calculating machine comprising a number of series of racks operative on forward and return strokes, differential mechanism, mechanism controlled by said differential mechanism for operating said series of racks, a series of calculating pinions controlled by each series of racks, means for determining which series of calculating pinions will be operated when said racks are operated, and means controlled by each series of calculating pinions controlling transfer operations of the corresponding series of racks independently of transfer operations of any other series of racks.

43. A calculating machine comprising a series of longitudinally movable supports, mechanism for reciprocating said supports longitudinally, series of independently movable racks carried by said supports, a series of calculating pinions for each series of racks, mechanism for operating a series of calculating pinions by the corresponding series of racks, means for controlling simultaneous or independent operation of each series of calculating pinions when said supports are operated, and devices controlled by each series of calculating pinions controlling transfer operations of the corresponding series of racks.

44. A calculating machine comprising mechanism operating on a forward and return stroke, series of calculating pinions, means for operating one series of said pinions in one direction and another series of said pinions in another direction during return stroke of said mechanism concurrently or selectively as desired, a paper carriage, and means operated by the paper carriage determining which series of calculating pinions will be operated in the different columnar positions of the paper carriage.

45. A calculating machine comprising mechanism operating on a forward and return stroke, series of calculating pinions, means for operating one series of said pinions in one direction and another series of said pinions in another direction during return stroke of said mechanism concurrently or selectively as desired, a paper carriage, means operated by the paper carriage determining which series of calculating pinions will be operated in the different columnar positions of the paper carriage, and means for determining and changing the direction of rotation of one series of calculating pinions by said mechanism.

46. A calculating machine comprising mechanism operating on a forward and return stroke, series of calculating pinions, means for operating one series of said pinions in one direction and another series of said pinions in another direction during return stroke of said mechanism concurrently or selectively as desired, a paper carriage, means operated by the paper carriage determining which series of calculating pinions will be operated in the different columnar positions of the paper carriage, and means other than said first named means for selectively determining which series of calculating pinions will be operated by said mechanism.

47. A calculating machine comprising mechanism operating on a forward and return stroke, a series of laterally shiftable pinions, racks with which said pinions may be selectively meshed and rotated optionally in either direction, a series of calculating pinions operated by said first named pinions in any position thereof, and means controlled by said calculating pinions controlling transfer operations of said racks.

48. A calculating machine comprising mechanism operating from and to a starting position, a series of calculating pinions operated by said mechanism during return movement of said mechanism to its starting position, means for selectively varying the direction of rotation of said pinions by said mechanism during return of said mechanism to its starting position, and means controlled by said pinions in either direction of rotation thereof controlling transfer operations of parts of said mechanism.

49. A calculating machine comprising a series of pairs of racks, mechanism for reciprocating said racks, a series of pinions, means for meshing said pinions with the different racks of said pairs of racks selectively, a series of calculating pinions under control of said first named pinions, and devices controlled by said calculating pinions controlling transfer operation of the racks with which said first named pinions are meshed.

50. A calculating machine comprising a series of pairs of racks, mechanism for reciprocating said racks, a series of pinions, means for meshing said pinions with the different racks of said pairs of racks selectively, a series of calculating pinions, means for operating said calculating pinions by said first named pinions to perform calculations in different directions of rotation, and devices controlled by said calculating pinions controlling transfer operations of the racks with which said first named pinions are meshed.

51. A calculating machine comprising a shiftable paper carriage, a series of swinging frames, a series of calculating pinions operatively supported by each of said frames, mechanism operative on a forward and return stroke, a series of sliding supports, means for operating said supports by said mechanism, gear elements operated by said supports, pinions operated by said gear elements, means for operating said swinging frames selectively to engage the calculating pinions supported by either of said frames with the corresponding ones of said other pinions, and means controlled by the paper carriage determining which of said swinging frames will be operated as aforesaid.

52. A calculating machine comprising mechanism operating on a forward and return stroke, a series of rack plates operated by said mechanism, a series of calculating pinions, means operated by said rack plates for rotating said pinions in either one of two directions on the return stroke of said mechanism, and means controlled by said pinions for operating said rack plates and thereby said pinions in transferring operations.

53. A calculating machine comprising mechanism operating on a forward and return stroke, series of rack plates supported and operated by parts of said mechanism, a series of calculating pinions corresponding to each series of rack plates, means operated by one series of rack plates for rotating the corresponding series of calculating pinions in either one of two directions on the return stroke of said mechanism, means controlled by each series of calculating pinions controlling transfer operations of said rack plates and said pinions, and means for selectively determining which series of calculating pinions will be operated on the return stroke of said mechanism.

54. A calculating machine comprising mechanism operating on a forward and return stroke, series of calculating pinions, series of rack plates supported and operated by parts of said mechanism for operating said series of calculating pinions selectively, means for controlling transfer operations of said series of calculating pinions by the corresponding series of rack plates, and means for selectively controlling operations of said series of calculating pinions.

55. A calculating machine comprising mechanism operating on a forward and return stroke, series of calculating pinions, series of rack plates supported and operated by parts of said mechanism for operating said series of calculating pinions selectively, means for controlling transfer operations of said series of calculating pinions by the corresponding series of rack plates, and means for controlling operation of said series of calculating pinions concurrently or selectively as desired.

56. A calculating machine comprising mechanism operating on a forward and return stroke, series of calculating pinions, series of rack plates supported and operated by parts of said mechanism for operating said series of calculating pinions selectively, means for controlling transfer operations of said series of calculatng pinions by the corresponding series of rack plates, means for controlling operation of said series of calculating pinions concurrently or selectively, as desired, means for limiting extent of forward stroke of said mechanism by either series of calculating pinions in a total taking operation, and means for controlling operation of another series of calculating pinions by its corresponding series of rack plates on the return stroke of said mechanism.

57. A machine of the character described comprising mechanism operating on a forward and return stroke, a series of laterally shiftable pinions, racks with which said pinions may be selectively meshed and rotated optionally in either direction, a series of calculating pinions operated by said first named pinions in any position thereof, and means controlled by one of said series of pinions controlling transfer operations of said racks.

58. A calculating machine comprising a series of pairs of racks, mechanism for reciprocating said racks, a series of pinions, means for meshing said pinions with either pair of said racks selectively, a series of calculating pinions operative by said first named pinions, and means for operating said racks in transfer operations.

59. A calculating machine comprising a series of pairs of racks, mechanism for reciprocating said racks, a series of pinions, means for meshing said pinions with either pair of said racks selectively, a series of calculating pinions operative by said first named pinions, means for operating said racks in transfer operations, and means controlled by one of said series of pinions limiting extent of movement of said mechanism in total taking and clearing operations.

60. A calculating machine comprising a series of pairs of racks, mechanism for reciprocating said racks, a series of pinions, means for meshing said pinions with either pair of said racks selectively, a series of calculating pinions operative by said first named pinions, means for operating said racks in transfer operations, and means controlled by one of said series of pinions limiting extent of movement of said mechanism in total taking and clearing operations irrespective of which series of racks said first named series of pinions engage.

61. A calculating machine comprising a settable part, separate sets of calculating devices supported independently of said part, means controlled by said part optionally controlling the operation of either set of calculating devices, and racks for operating said calculating devices under control of said part.

62. A calculating machine comprising a settable part, separate sets of calculating devices supported independently of said part, means controlled by said part optionally controlling the operation of either set of calculating devices, racks for operating said calculating devices under control of said part, and means operative independently of said settable part determining which set of calculating devices may be operated.

63. A calculating machine comprising a settable part, a number of calculating mechanisms supported independently of said part, and means under control of said settable part preventing operation of certain of said calculating mechanisms and permitting operation of others selectively.

64. A calculating machine comprising a settable part, a number of calculating mechanisms supported independently of said part, means under control of said settable part preventing operation of certain of said calculating mechanisms and permitting operation of others selectively, and devices operative independently of said settable part determining which of said calculating mechanisms may operate.

65. A calculating machine comprising series of rack plates, a pair of racks on each plate, pinions movable to engage with either pair of racks selectively, intermediate pinions in permanent engagement with said first named pinions, a series of calculating pinions movable into and out of engagement with said intermediate pinions, and means controlled by said calculating pinions controlling transfer operation of said calculating pinions.

66. A calculating machine comprising series of rack plates, a pair of racks on each plate, pinions movable to engage with either pair of racks selectively, intermediate pinions in permanent engagement with said first named pinions, a series of calculating pinions movable into and out of engagement with said intermediate pinions, and means controlled by said calculating pinions controlling transfer operations of said rack plates and thereby said first named pinions and said intermediate pinions to operate said calculating pinions in transferring from lower to higher denominational orders.

67. A calculating machine comprising a series of longitudinally movable supports, series of calculating pinions, a series of racks on said supports for operating the respective series of calculating pinions, means for preventing effective operation of the series of calculating pinions selectively, means for operating any selected series of calculating pinions by the corresponding series of racks, and means controlled by said calculating pinions controlling transfer operations of the corresponding racks leaving the racks corresponding to unoperated series of calculating pinions ineffective to transfer.

68. A machine of the character described comprising series of laterally shiftable pinions, pairs of racks with each pair of which said pinions may be selectively engaged, manual mechanism for shifting said pinions to engage said pairs of racks selectively, a series of calculating pinions, and means for controlling operation of said calculating pinions by said first named pinions in adding and transferring operations in either position of said first named pinions.

69. A machine of the character described comprising a normally operative calculating mechanism, series of additional calculating mechanisms, means for preventing effective operation of said additional calculating mechanisms and permitting operation of said first named calculating mechanism, means for selectively rendering said additional calculating mechanisms operative, actuators for said additional calculating mechanisms, and means for operating said additional calculating mechanisms in adding and transferring operations by said actuators.

70. A calculating machine comprising two sets of racks, a series of pinions movable laterally out of engagement with either set of racks and into engagement with the other set of racks optionally, a set of calculating pinions, means for operating said calculating pinions by said first named pinions, latches holding said racks from transfer movement, means operated by said calculating pinions for releasing said latches irrespective of the set of racks engaged by said first named pinions, and means for operating said racks in transferring when said latches are released.

71. A calculating machine comprising two sets of racks, a series of pinions movable laterally out of engagement with either set of racks and into engagement with the other set of racks optionally, a set of calculating pinions, means for operating said calculating pinions by said first named pinions, latches holding said racks from transfer movement, means operated by said calculating pinions for releasing said latches irrespective of the set of racks engaged by said first named pinions, means for operating said racks in transferring when said latches are released, and mechanism controlling clearing operations of said pinions while said first named pinions engage either set of racks.

72. A calculating machine comprising two sets of racks, a series of pinions movable laterally out of engagement with either set of racks and into engagement with the other set of racks optionally, a set of calculating pinions, means for operating said calculating pinions by said first named pinions, latches holding said racks from transfer movement, means operated by said calculating pinions for releasing said latches irrespective of the set of racks engaged by said first named pinions, means for operating said racks in transferring when said latches are released, mechanism controlling clearing operations of said pinions while said first named pinions engage either set of racks, and means for preventing operation of said clearing mechanism until a transfer operation is complete.

73. A calculating machine comprising two sets of racks, a series of pinions movable laterally out of engagement with either set of racks and into engagement with the other set of racks optionally, a set of calculating pinions, means for operating said calculating pinions by said first named pinions, latches holding said racks from transfer movement, means operated by said calculating pinions for releasing said latches irrespective of the set of racks engaged by said first named pinions, means for operating said racks in transferring when said latches are released, mechanism controlling clearing operations of said pinions while said first named pinions engage either set of racks, means for preventing operation of said clearing mechanism until a transfer operation is complete, and means for adding an additional 1 into units denominational calculating pinion during a transfer operation when said first named pinions engage one set of said racks.

74. A calculating machine comprising two sets of racks, a series of pinions movable laterally out of engagement with either set of racks and into engagement with the other set of racks optionally, a set of calculating pinions, means for operating said calculating pinions by said first named pinions, latches holding said racks from transfer movement, means operated by said calculating pinions for releasing said latches irrespective of the set of racks engaged by said first named pinions, means for operating said racks in transferring when said latches are released, mechanism controlling clearing operations of said pinions while said first named pinions engage either set of racks, means for preventing operation of said clearing mechanism until a transfer operation is complete, and means for adding an additional 1 into units denominational calculating pinion during a transfer operation when said first named pinions engage one set of said racks and preventing addition of said 1 when said first named pinions engage the other set of racks.

75. A calculating machine comprising two sets of racks, a set laterally shiftable pinions engageable with the racks of either set selectively, a set of calculating pinions operative by said first named pinions irrespective of the set of racks engaged by said first named pinions, and means under control of said calculating pinions permitting operation of said racks to make transfer.

76. A calculating machine comprising two sets of racks, a set of laterally shiftable pinions engageable with the racks of either set selectively, a set of calculating pinions operative by said first named pinions irrespective of the set of racks engaged by said first named pinions, means under control of said calculating pinions permitting operation of said racks to make transfer, and automatic means for introducing 1 into the units calculating pinion by a transferring operation of one of the corresponding racks.

77. A calculating machine comprising two sets of racks, a set of laterally shiftable pinions engageable with the racks of either set selectively, a set of calculating pinions operative by said first named pinions irrespective of the set of racks engaged by said first named pinions, means under control of said calculating pinions permitting operation of said racks to make transfer, automatic means for introducing 1 into the units calculating pinion by a transferring operation of one of the corresponding racks, and mechanism controlling clearing operations of said calculating pinions irrespective of the set of racks engaged by said first named pinions.

78. A calculating machine comprising mechanism having a forward and return stroke when operated, a series of pinions, means for rotating said pinions by said mechanism in either direction during the return stroke of said mechanism, calculating pinions operated by said first named pinions in either of two directions on the return stroke of said mechanism, and transfer mechanism controlled by said calculating pinions irrespective of the direction of their rotation.

79. A calculating machine comprising mechanism having a forward and return stroke when operated, a series of pinions, means for rotating said pinions by said mechanism in either direction during the return stroke of said mechanism, calculating pinions operated by said first named pinions in either of two directions on the return stroke of said mechanism, transfer mechanism controlled by said calculating pinions irrespective of the direction of their rotation, and means for causing said transfer mechanism to introduce 1 into units calculating pinion during a transfer operation in one direction of rotation of said calculating pinions.

80. A calculating machine comprising mechanism having a forward and return stroke when operated, a series of pinions, means for rotating said pinions by said mechanism in either direction during the return stroke of said mechanism, calculating pinions operated by said first named pinions in either of two directions on the return stroke of said mechanism, transfer mechanism controlled by said calculating pinions irrespective of the direction of their rotation, means for causing said transfer mechanism to introduce 1 into units calculating pinion during a transfer operation in one direction of rotation of said calculating pinions, and mechanism controlling clearing operations of said calculating pinions irrespective of the direction in which they have been operated.

81. A calculating machine comprising mechanism having a forward and return stroke when operated, a series of pinions, means for rotating said pinions by said mechanism in either direction during the return stroke of said mechanism, calculating pinions operated by said first named pinions in either of two directions on the return stroke of said mechanism, transfer mechanism controlled by said calculating pinions irrespective of the direction of their rotation, means for causing said transfer mechanism to introduce 1 into units calculating pinion during a transfer operation in one direction of rotation of said calculating pinions, mechanism controlling clearing operations of said calculating pinions irrespective of the direction in which they have been operated, and means for preventing operation of said clearing mechanism until the 1 intended for such units calculating pinion has been introduced into said units calculating pinions.

82. Calculating mechanism comprising a set of racks, another set of racks spaced from and facing the first set of racks, a series of pinions between said racks, means for shifting said pinions laterally out of engagement with either set of racks and into engagement with the other set of racks as desired, a set of calculating pinions, means for operating said calculating pinions by said first named pinions irrespective of the set of racks engaged by said first named pinions, latches controlling transfer operations of said racks, and means controlled by said calculating pinions for releasing said latches to permit transfer operations of said racks.

83. Calculating mechanism comprising a set of racks, another set of racks spaced from and facing the first set of racks, a series of pinions between said racks, means for shifting said pinions laterally out of engagement with either set of racks and into engagement with the other set of racks as desired, a set of calculating pinions, means for operating said calculating pinions by said first named pinions irrespective of the set of racks engaged by said first named pinions, latches controlling transfer operations of said racks, and means controlled by said calculating pinions for releasing said latches to permit transfer operations of said racks, irrespective of which set of racks said first named pinions engage.

84. A calculating machine comprising a series of plates arranged in denominational orders, a pair of racks supported by each plate, a series of pinions, means for moving said pinions laterally to engage one of said pinions with either rack on the corresponding plate as desired, a series of calculating pinions, means for operating said calculating pinions by said first named pinions irrespective of the racks which said first named pinions engage, a latch for each plate, means operated by said calculating pinions for releasing said latches, and means for operating the plates in transfer movements when the latches are released as aforesaid.

85. A calculating machine comprising a totalizing mechanism, a set of racks for operating said totalizing mechanism in one direction, an additional set of racks for operating said totalizing mechanism in the opposite direction, a set of calculating pinions, a single set of latches controlling both sets of racks, means operated by said calculating pinions for releasing said latches to permit transfer operations of either set of racks, and means for operating said racks in transfer operations.

86. A calculating mechanism comprising a totalizing mechanism, racks for operating the totalizing mechanism in adding and transferring operations, mechanism for clearing the totalizing mechanism, a series of calculating pinions, and mechanism for rotating the calculating pinions in either direction from a starting position as an incident to the clearing of said totalizing mechanism.

87. A calculating mechanism comprising a totalizing mechanism, racks for operating the totalizing mechanism in adding and transferring operations, mechanism for clearing the totalizing mechanism, a series of calculating pinions, mechanism for rotating the calculating pinions in either direction from a starting position as an incident to the clearing of said totalizing mechanism, and means for effecting transfer operations between said calculating pinions.

88. A calculating machine comprising a series of slides, a number of series of racks movably supported by said slides, a series of pinions operated by each series of racks, means controlling operation of said pinions by said racks, and means controlled by said pinions controlling transfer operations of said racks.

89. A calculating machine comprising a series of slides, a number of series of racks movably supported by said slides, a series of pinions operated by each series of racks, means controlling operation of said pinions by said racks, means controlled by said pinions controlling transfer operations of said racks, and mechanism controlling clearing operations of said pinions by said racks.

90. A calculating machine comprising a series of slides, a number of series of racks movably supported by said slides, a series of pinions operated by each series of racks, means controlling operation of said pinions by said racks, means controlled by said pinions controlling transfer operations of said racks, mechanism controlling clearing operations of said pinions by said racks, and means for preventing a clearing operation of said pinions in certain relationships of said pinions to said racks.

91. A calculating machine comprising two series of reciprocating racks, a series of pinions movable into engagement with either series of racks as desired, calculating pinions under control of said first named pinions irrespective of which series of racks the first named racks engage whereby said calculating pinions are rotated in one direction when said first named pinions engage one series of racks and are rotated in the opposite direction when said first named pinions engage the other series of racks, means for preventing or permitting operation of said calculating pinions when said racks operate, as desired, and devices controlled by said calculating pinions controlling transfer operations thereof by said racks.

92. A calculating machine comprising a series of calculating pinions, mechanism for rotating said pinions in one direction for addition and in the opposite direction for subtraction during the return movement of said mechanism to its starting position, mechanism acting upon said calculating pinions to obtain a correct negative total in subtraction automatically as an incident to the return of said operating mechanism to its starting position, said last named mechanism comprising means for transferring 1 to the calculating pinion in units denominational order, and means controlled by said calculating pinions controlling transfer operation thereof by said first named mechanism.

WALTER WM. LANDSIEDEL.